United States Patent
Oomura

(10) Patent No.: US 8,047,274 B2
(45) Date of Patent: Nov. 1, 2011

(54) AIR CONDITIONER FOR VEHICLE

(75) Inventor: Mitsuyo Oomura, Hekinan (JP)

(73) Assignee: Denso Corporation, Kariya (JP)

( * ) Notice: Subject to any disclaimer, the term of this patent is extended or adjusted under 35 U.S.C. 154(b) by 961 days.

(21) Appl. No.: 12/008,967

(22) Filed: Jan. 15, 2008

(65) Prior Publication Data

US 2008/0168766 A1    Jul. 17, 2008

(30) Foreign Application Priority Data

Jan. 17, 2007    (JP) ................ 2007-007976

(51) Int. Cl.
*B60H 1/03*    (2006.01)
*B60H 1/32*    (2006.01)

(52) U.S. Cl. .......... 165/202; 165/266; 165/271; 165/42; 165/43; 237/2 A; 237/12.3 R; 237/12.3 B; 180/65.27; 180/65.28

(58) Field of Classification Search ............ 165/202, 165/42, 43, 271, 266; 237/2 A, 12.3 R, 12.3 B; 180/65.27, 65.28
See application file for complete search history.

(56) References Cited

U.S. PATENT DOCUMENTS

| | | | |
|---|---|---|---|
| 6,079,485 A | | 6/2000 | Esaki et al. |
| 6,504,259 B1 * | | 1/2003 | Kuroda et al. ........... 180/65.27 |
| 6,735,502 B2 * | | 5/2004 | Phillips et al. ........... 180/65.27 |
| 7,325,595 B2 | | 2/2008 | Homan et al. |
| 7,836,987 B2 * | | 11/2010 | Aoki ........................ 180/65.28 |

FOREIGN PATENT DOCUMENTS

| | | |
|---|---|---|
| JP | 5-18909 | 3/1993 |
| JP | 10-278569 | 10/1998 |
| JP | 2002-211238 | 7/2002 |
| JP | 2006-115742 | 5/2006 |
| JP | 2007-308133 | 11/2007 |

OTHER PUBLICATIONS

Office Action dated Oct. 27, 2010 in the corresponding DE Application No. 102008003930.6 with English translation.
Office action dated Sep. 10, 2008 in Japanese Application No. 2007-007976.

* cited by examiner

*Primary Examiner* — John Ford
(74) *Attorney, Agent, or Firm* — Harness, Dickey & Pierce, PLC

(57) ABSTRACT

An air conditioner for a vehicle includes a main heater for heating air in a vehicle compartment using coolant of an engine of the vehicle as a heat source, and an auxiliary heater for heating air in the vehicle compartment using a heat source other than exhaust heat of the engine. In the air conditioner, a requirement signal for requiring startup of the engine is output when a temperature of the coolant of the engine is determined to be lower than a threshold, and the threshold is adjusted based on an operating state of the auxiliary heater such that as an amount of heat generated by the auxiliary heater increases, the threshold decreases. Accordingly, as the heating capacity of the auxiliary heater is increased, the startup of the engine becomes more difficult.

8 Claims, 17 Drawing Sheets

AIR CONDITIONER FOR VEHICLE

CROSS REFERENCE TO RELATED APPLICATION

This application is based on Japanese Patent Application No. 2007-007976 filed on Jan. 17, 2007, the contents of which are incorporated herein by reference in its entirety.

FIELD OF THE INVENTION

The present invention relates to a vehicle air conditioner having a heater for heating air in a vehicle compartment by using exhaust heat from an engine.

BACKGROUND OF THE INVENTION

Conventionally, an air conditioner for a hybrid vehicle determines whether or not it is necessary to heat the interior of the vehicle based on sensor signals or the like from an inside air temperature sensor and an outside air temperature sensor, even when the temperature of coolant of an engine detected by a water temperature sensor is low. When the heating of the vehicle interior is determined to be necessary, the engine is operated even in an operation state of the hybrid vehicle at startup or during a low-speed vehicle running. Therefore, the coolant can be sufficiently warmed in a water jacket of the engine, and the warmed water is supplied to a heater core so as to heat the vehicle interior (see, for example, JP-A-10-278569).

In the above air conditioner, when the heating of the vehicle interior is determined to be necessary, the engine is operated to ensure a heating capacity in the air conditioner. However, in this case, fuel efficiency in the engine is deteriorated.

SUMMARY OF THE INVENTION

In view of the foregoing problems, it is an object of the present invention to provide an air conditioner for a vehicle, which ensures heating performance in an air conditioner, while suppressing deterioration of fuel efficiency in an engine.

According to an aspect of the present invention, an air conditioner for a vehicle includes a main heater for heating air in a vehicle compartment using coolant of an engine of the vehicle as a heat source, an auxiliary heater for heating air in the vehicle compartment using a heat source other than exhaust heat of the engine, signal output means for outputting a requirement signal for requiring startup of the engine when a temperature of the coolant of the engine is determined to be lower than a threshold, and threshold adjustment means for adjusting the threshold based on an operating state of the auxiliary heater such that as an amount of heat generated by the auxiliary heater increases, the threshold is decreased.

Accordingly, as the amount of heat generated by the auxiliary heater is more increased, it become more difficult to determine that the temperature of the coolant of the engine is lower than the threshold, thereby it becomes more difficult to output the requirement signal for requiring startup of the engine. Thus, heating performance in the air conditioner can be improved while deterioration of fuel efficiency in the engine can be restricted.

The air conditioner may be further provided with an air conditioning case having an air outlet for blowing out air into the vehicle compartment, a blower disposed in the air conditioning case for blowing air toward the air outlet, a cooler disposed in the air conditioning case for cooling air blown from the blower, temperature adjustment means for adjusting a temperature of air to be blown out from the air outlet into the vehicle compartment by adjustment of an amount of heat added to the cooled air by the main heater, detection means for detecting a state of an environment in the vehicle compartment, calculation means for calculating a target temperature (TAO) of air to be blown from the air outlet based on a detection value of the detection means, the target temperature (TAO) being required for maintaining the temperature of air in the vehicle compartment at a preset temperature, and a temperature control means for controlling the temperature adjustment means such that the temperature of air blown out from the air outlet approaches the target temperature (TAO). In this case, when the target temperature (TAO) is lower than a first temperature, the requirement signal is not output by the signal output means; and when the target temperature (TAO) is equal to or higher than the first temperature and lower than a second temperature that is higher than the first temperature, the threshold is increased as the target temperature (TAO) increases. Furthermore, when the target temperature (TAO) is equal to or higher than the second temperature, the threshold is a constant value, and the constant value is set to be decreased as the amount of heat generated by the auxiliary heater increases.

For example, the second temperature is set so as to be different for each level of heat generated by the auxiliary heater. In this case, when the target temperature (TAO) is equal to or higher than the first temperature and lower than the second temperature, a gradient of the target temperature (TAO) with respect to the threshold for each level of heat generated by the auxiliary heater is set to have the same value. Alternatively, the second temperature for each level of heat generated by the auxiliary heater is set to the same temperature. In this case, when the target temperature (TAO) is equal to or higher than the first temperature and lower than the second temperature, a gradient of the target temperature (TAO) with respect to the threshold is set to be different for each level of heat generated by the auxiliary heater.

According to another aspect of the present invention, an air conditioner for a vehicle includes: an air conditioning case having an air outlet for blowing out air into a vehicle compartment; a blower disposed in the air conditioning case for blowing air toward the air outlet; a cooler disposed in the air conditioning case for cooling air blown from the blower; a main heater for heating air from the cooler using coolant of an engine of the vehicle as a heat source; an auxiliary heater for heating air to be blown into the vehicle compartment using a heat source other than exhaust heat of the engine; temperature adjustment means for adjusting a temperature of air to be blown from the air outlet into the vehicle compartment by adjustment of an amount of heat added to the cooled air by the main heater; detection means for detecting a state of an environment in the vehicle compartment; calculation means for calculating a target temperature (TAO) of air blown from the air outlet based on a detection value of the detection means, the target temperature (TAO) being required for maintaining the temperature of air in the vehicle compartment at a preset temperature; temperature control means for controlling the temperature adjustment means such that the temperature of air blown out from the air outlet approaches the target temperature (TAO); signal output means for outputting a requirement signal for requiring the engine to be rotated with a higher rotation speed as the target temperature (TAO) becomes higher; and rotation speed setting means for setting a required rotation speed of the engine to be lower as an amount of heat generated by the auxiliary heater increases.

Accordingly, as the target temperature becomes higher, the requirement signal is output such that the engine is rotated with a higher rotation speed. Thus, as the target temperature becomes higher, the exhaust heat of the engine becomes larger, thereby increasing heat quantity generated in the main heater.

For example, in the air conditioner, when the target temperature (TAO) is lower than a first temperature, the rotation speed setting means sets the required rotation speed of the engine to a first constant value; and when the target temperature (TAO) is equal to or higher than the first temperature and lower than a second temperature that is higher than the first temperature, the rotation speed setting means sets the required rotation speed of the engine to be increased from the first constant speed as the target temperature (TAO) increases. In addition, when the target temperature (TAO) is equal to or higher than the second temperature, the rotation speed setting means sets the required rotation speed of the engine to a second constant value higher than the first constant speed. Furthermore, the second constant value is set to be decreased as the amount of heat generated by the auxiliary heater increases.

The second temperature may be set so as to be different for each level of heat generated by the auxiliary heater. In this case, when the target temperature (TAO) is equal to or higher than the first temperature and lower than the second temperature, a gradient of the target temperature (TAO) with respect to the required rotation speed of the engine for each level of heat generated by the auxiliary heater is set to have the same value. Alternatively, the second temperature for each level of heat generated by the auxiliary heater may be set to the same temperature. In this case, when the target temperature (TAO) is equal to or higher than the first temperature and lower than the second temperature, a gradient of the target temperature (TAO) with respect to the required rotation speed of the engine is set to be different for each level of heat generated by the auxiliary heater.

The auxiliary heater may be at least one of a steering heater for heating a steering of the vehicle, a seat heater for heating a seat in the vehicle compartment, an air heater unit for heating air in the vehicle compartment, a coolant heater unit for heating the coolant of the engine, and an electric heater.

DETAILED DESCRIPTION OF THE PREFERRED EMBODIMENTS

First Embodiment

Figure 1:
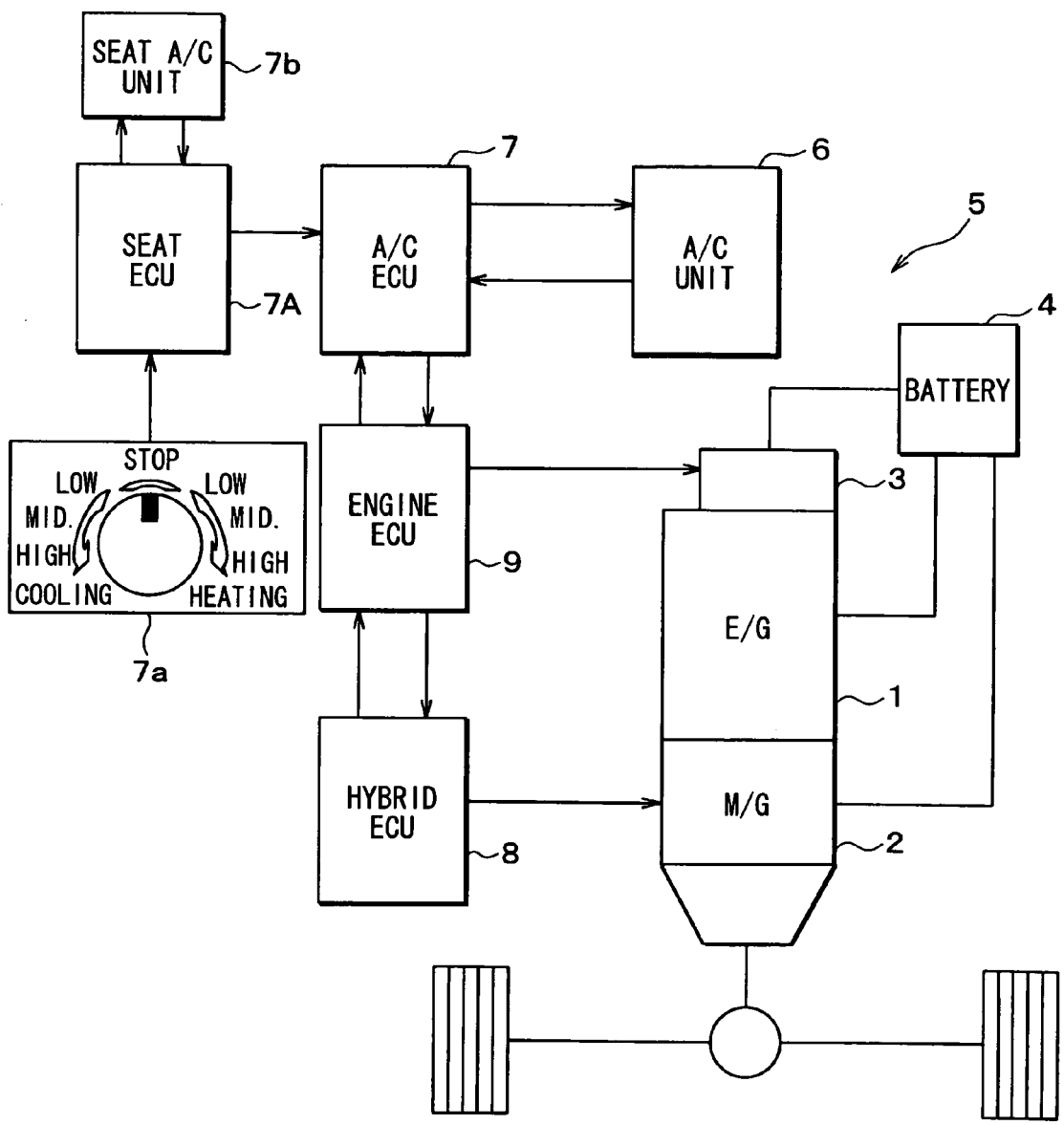
FIG. 1 is a block diagram showing a schematic configuration of a hybrid vehicle according to a first embodiment of the invention.
Figure 2:
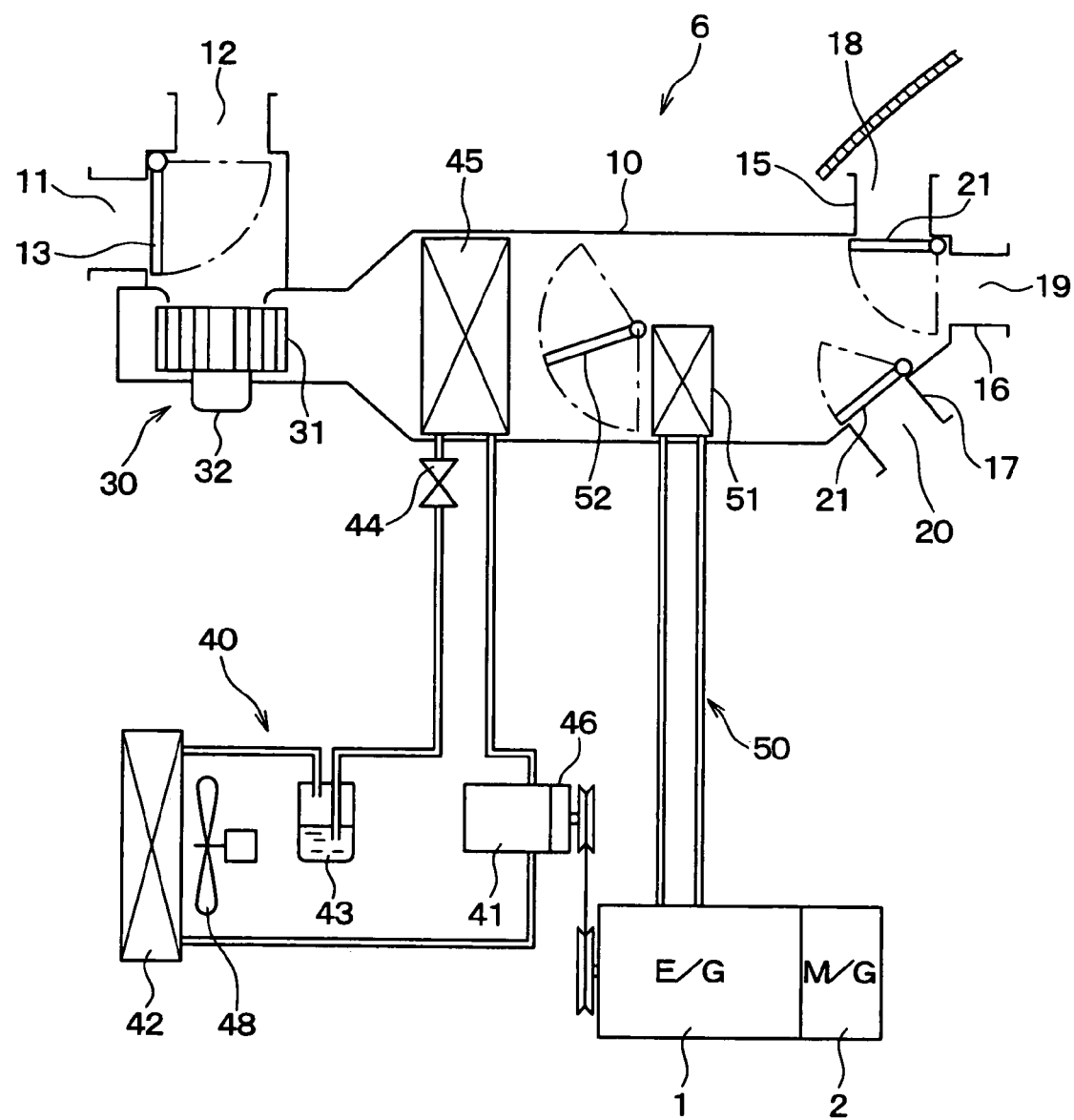
FIG. 2 is a schematic diagram showing a structure of an air conditioning unit shown in FIG. 1.

A first embodiment of the present invention will be now described with reference to FIGS. 1 to 12. FIG. 1 is a block diagram showing a schematic configuration of a hybrid vehicle according to the first embodiment of the invention, and FIG. 2 is a schematic diagram showing a structure of an air conditioning unit shown in FIG. 1.

As shown in FIG. 1, a hybrid vehicle 5 of this embodiment includes an engine 1 (E/G) for vehicle running, an electric motor 2 (M/G) for vehicle running, an engine starter 3, a battery 4, an air conditioning unit 6 (A/C unit), an air conditioning ECU 7 (A/C ECU), a seat ECU 7A, a setting unit 7a, a seat air conditioning unit 7b, a hybrid ECU 8, and an engine ECU 9.

The engine 1 for vehicle running is disengageably connected to and driven by an axle of the hybrid vehicle 5. The electric motor 2 for vehicle running is disengageably connected to and driven by the axle of the hybrid vehicle 5. The motor 2 is adapted to be connected to the axle when the engine 1 for vehicle running is not connected to the axle of the hybrid vehicle 5.

The electric motor 2 for vehicle running is configured to be automatically controlled by the hybrid ECU 8 (for example, subjected to inverter control). The engine starter 3 starts the engine 1 for vehicle running. The engine ECU 9 controls energization of the engine starter 3 to operate the engine 1 when running of the hybrid vehicle 5 and charging of the battery 4 are necessary. The hybrid ECU 8 communicates with the engine ECU 9 to stop the engine 1 and operate the electric motor 2 in traveling such that a combustion efficiency of gasoline (fuel) is optimal, if necessary.

The seat air conditioning unit 7b is a well-known air conditioning device (auxiliary heater) for blowing warm air or cool air from each hole in a seat surface toward a passenger. The seat air conditioning unit 7b includes a blower and a Peltier element for heating or cooling the air blown from the blower. The seat ECU 7A switches between heating operation and cooling operation of the blown air by switching between polarities of a voltage applied to the Peltier element. The seat ECU 7A adjusts the amount of heating (or amount of heat absorption) of the blown air by adjusting the level of the voltage applied to the Peltier element. The setting unit 7a can be manually operated by a passenger, so as to perform a switching between the cooling operation and heating operation of the seat air conditioning unit 7b, adjustment of the cooling level, and adjustment of the heating level.

As shown in FIG. 2, the air conditioning unit 6 includes an air conditioning case 10 for forming an air passage for guiding the conditioned air into the vehicle compartment, a centrifugal blower 30 for generating an air flow in the air conditioning case 10, a refrigeration cycle 40 for cooling the air flowing in the air conditioning case 10, and a coolant circuit 50 or the like for heating the air flowing in the air conditioning case 10.

The air conditioning case 10 is disposed on the front side in the vehicle compartment of the hybrid vehicle 5. The most upstream side (windward side) of the air conditioning case 10 constitutes an air inlet switching box (inside/outside air switching box), and includes an inside air inlet 11 for taking in air in the vehicle compartment (hereinafter referred to as an inside air), and an outside air inlet 12 for taking in air outside the vehicle compartment (hereinafter referred to as an outside air).

An inside/outside air switching damper 13 (air inlet switching damper) is rotatably attached to open and close the inside air inlet 11 and the outside air inlet 12. The inside/outside air switching damper 13 is driven by an actuator 14, such as a servo motor, and adapted to switch the air inlet mode between an inside air circulation mode and an outside air introduction mode, for example.

The most downstream side (leeward side) of the air conditioning case 10 constitutes an air outlet switching portion, and is provided with a defroster (DEF) opening, a face (FACE) opening, and a foot (FOOT) opening. The DEF opening is connected to a defroster duct 15, and a defroster (DEF) air outlet 18 is opened for mainly blowing out the warm air toward the inner surface of a front windshield of the hybrid vehicle 5 at the end of the most downstream side of the defroster duct 15.

The FACE opening is connected to a face duct 16, and a face (FACE) air outlet 19 is opened for mainly blowing out the cool air to the head and chest (i.e., upper portion) of the passenger at the end of the most downstream side of the face duct 16. The FOOT opening is connected to a foot duct 17, and a foot (FOOT) air outlet 20 is opened for mainly blowing out the warm air toward the foot of the passenger at the end of the most downstream side of the foot duct 17.

Two air-outlet switching dampers 21 are rotatably attached to the insides of respective air outlets. Each of the two air-outlet switching dampers 21 is driven by an actuator 22, such as a servo motor, to switch an air outlet mode among a face (FACE) mode, a bi-level (B/L) mode, a foot (FOOT) mode, a foot/defroster (F/D) mode, and a defroster (DEF) mode.

The centrifugal blower 30 includes a centrifugal fan 31 rotatably accommodated in a scroll case integrally formed with the air conditioning case 10, and a blower motor 32 for rotatably driving the centrifugal fan 31. The blower motor 32 controls an amount of blown air (the rotation speed of the centrifugal fan 31) based on a blower terminal voltage (hereinafter referred to as a blower voltage) applied via a blower driving circuit 33.

The refrigeration cycle 40 includes a compressor 41 driven via a belt by the engine 1 for compressing the refrigerant, a condenser (refrigerant condenser) 42 for cooling and liquefying the compressed refrigerant, a receiver (a liquid receiver and a gas/liquid separator) 43 for separating the condensed and liquefied refrigerant into vapor and liquid phases and for allowing only the liquid refrigerant to flow to the downstream side, an expansion valve 44 for decompressing and expanding the liquid refrigerant, an evaporator (cooling device) 45 for evaporating and gasifying the decompressed and expanded refrigerant, and refrigerant pipes or the like for connecting these elements in an annular shape.

The evaporator 45 among the above elements of the refrigeration cycle 40 is disposed in the air conditioning case 10, and is an indoor heat exchanger that performs an air cooling operation for cooling air passing through the evaporator itself and an air dehumidifying operation for dehumidifying air passing therethrough. The compressor 41 is connected to an electromagnetic clutch 46 serving as a clutch unit for intermittently transferring the rotational power from the engine 1 to the compressor 41. The electromagnetic clutch 46 is controlled by the air conditioning ECU 7 via a clutch driving circuit 47.

When the electromagnetic clutch 46 is turned ON, the rotational power from the engine 1 is transferred to the compressor 41, thereby causing the evaporator 45 to perform the air cooling operation. When the energization of the electromagnetic clutch 46 is stopped (turned OFF), the engine 1 and the compressor 41 are interrupted from each other to stop the air cooling operation performed by the evaporator 45.

The condenser 42 is disposed in a position where it easily receives running air caused by the running of the hybrid vehicle 5. The condenser 42 is an outdoor heat exchanger for exchanging heat between the refrigerant flowing therein and the running air and outside air blown by the cooling fan 48.

The coolant circuit 50 is a circuit for circulating the coolant warmed by the water jacket of the engine 1 by use of a water pump (not shown), and includes a radiator (not shown), a thermostat (not shown), and a heater core 51. The heater core 51 corresponds to a main heater (first heater), and allows the coolant for cooling the engine 1 to flow into the engine 1. The heater core 51 heats the cool air after passing through the evaporator 45, using the coolant as a heat source for heating.

The heater core 51 is disposed on a downstream side of the evaporator 45 in the air conditioning case 10 so as to partly cover the air passage in cross section. An air mix damper 52 is rotatably attached to an air upstream side of the heater core 51. The air mix damper 52 is driven by an actuator 53, such as a servo motor. The air mix damper 52 serves as temperature adjustment means for adjusting a temperature of the air blown out into the vehicle compartment by adjusting the ratio of the amount of air passing through the heater core 51 and the amount of air bypassing the heater core 51 according to a stopped position of the damper 52.

Now, the configuration of a control system of the first embodiment will be described based on FIGS. 1, 3, and 4. The air conditioning ECU 7 receives communication signals output from the engine ECU 9, switch signals from each switch on a control panel 60 provided at the front of the vehicle compartment, and sensor signals from the sensors 71 to 75.

Figure 4:
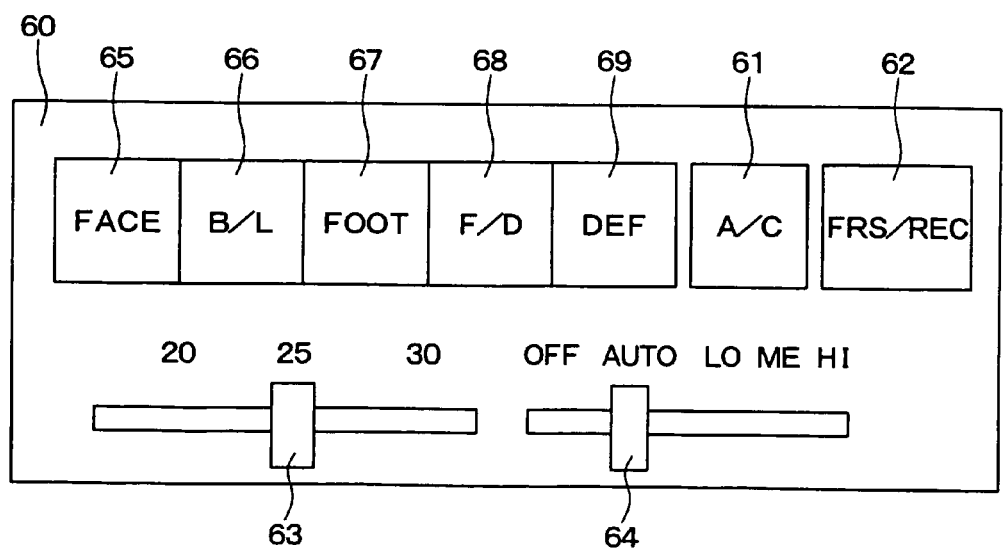
FIG. 4 is a schematic diagram showing a structure of a control panel shown in FIG. 3.

The respective switches on the control panel 60, as shown in FIG. 4, include an air conditioning (A/C) switch 61 for commanding startup and stop of the refrigeration cycle 40 (compressor 41), an air inlet selector switch 62 for switching the air inlet mode, a temperature setting lever 63 for setting the temperature in the vehicle compartment to a desired one, an air amount switching lever 64 for switching the amount of air blown by the centrifugal fan 31, and air-outlet selector switches for switching the air outlet mode.

The air-outlet selector switches include a face (FACE) switch 65 for setting the air outlet mode to a FACE mode, a bi-level (B/L) switch 66 for setting it to a B/L mode, a foot (FOOT) switch 67 for setting it to a FOOT mode, a foot/defroster (F/D) switch 68 for setting it to a F/D mode, and a defroster (DEF) switch 69 for setting it to a DEF mode.

Figure 3:
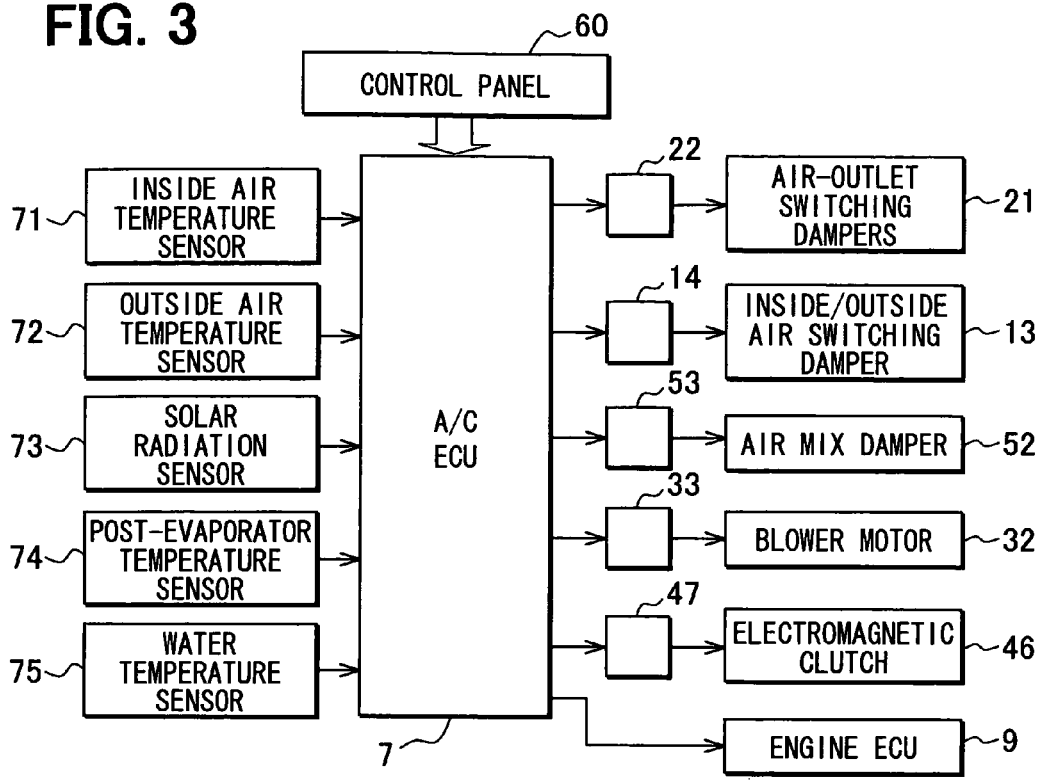
FIG. 3 is a block diagram showing an electric configuration of the air conditioning unit shown in FIG. 2.

As shown in FIG. 3, the above-described sensors include an inside air temperature sensor 71 for detecting the temperature of the air in the vehicle compartment (inside air temperature), an outside air temperature sensor 72 for detecting the temperature of the air outside the vehicle compartment (outside air temperature), a solar radiation sensor 73 for detecting the amount of solar radiation entering to the vehicle interior, a post-evaporator temperature sensor 74 for detecting an air cooling degree effected by the evaporator 45, and a water temperature sensor 75 for detecting the temperature of the coolant (coolant temperature) flowing into the heater core 51. The above-described respective sensors correspond to detection portions for detecting an environmental condition of the vehicle.

The air conditioning ECU 7 includes a microcomputer that is constructed of a CPU, a ROM, a RAM, and the like (all of which are not shown). Sensor signals from the respective sensors 71 to 75 are A/D converted from an analog form to a digital form by an input circuit (not shown) in the air conditioning ECU 7, and then input into the microcomputer.

The engine ECU 9 receives inputs of the respective sensor signals as operating state detection means for detecting an operating state of the hybrid vehicle 5, as well as inputs of communication signals from the air conditioning ECU 7 and the hybrid ECU 8. The sensors for use include an engine rotation speed sensor, a vehicle speed sensor, a throttle opening degree sensor, a battery voltmeter, and a coolant temperature sensor (any one of which is not shown), and the like, generally. A microcomputer constructed of the CPU, the ROM, the RAM (not shown), and the like is provided inside the engine ECU 9. The sensor signals from the respective sensors are A/D converted from the analog form into the digital form by the input circuit (not shown) in the engine ECU 9, and then input into the microcomputer.

Figure 5:
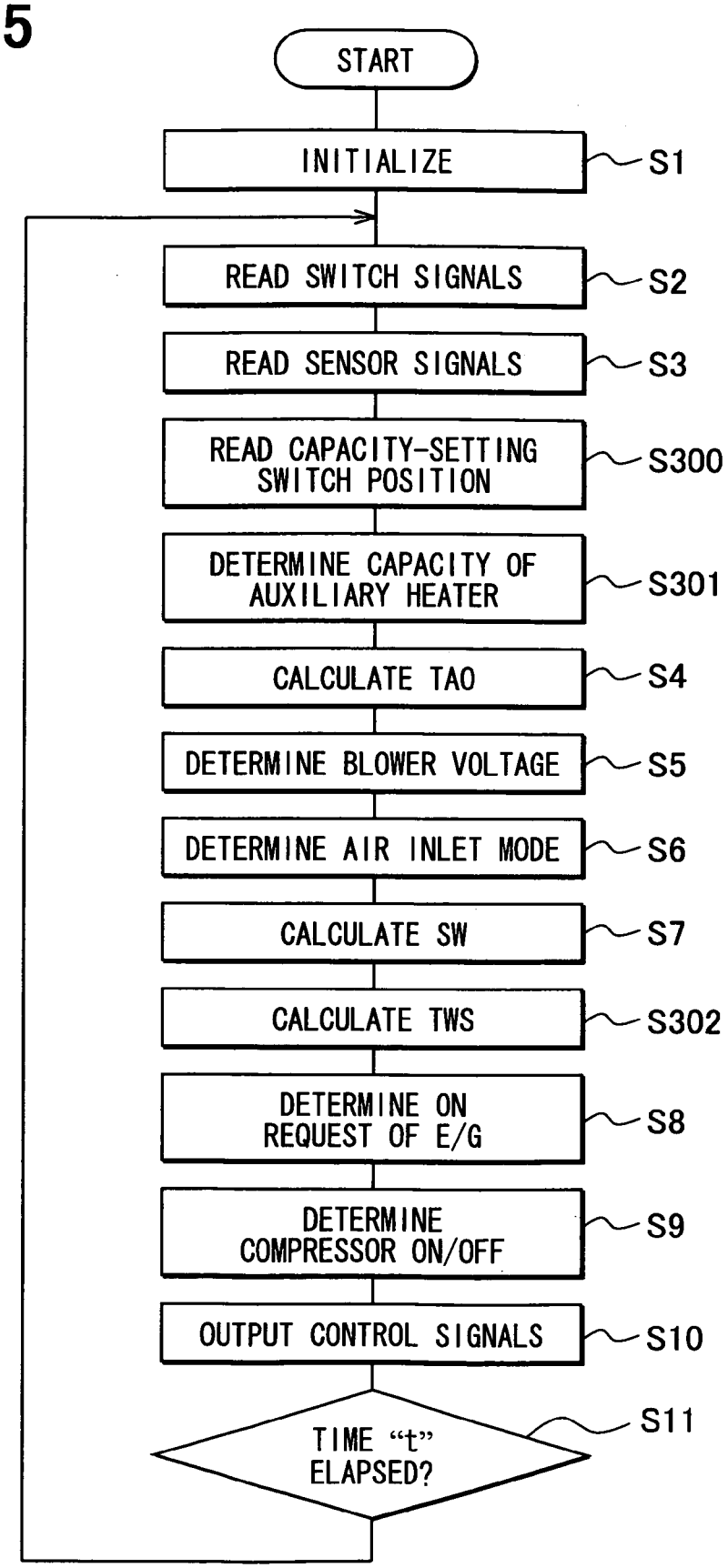
FIG. 5 is a flowchart showing a control process performed by an air conditioning ECU shown in FIG. 3.

Now, control process performed by the air conditioning ECU 7 of this embodiment will be described based on FIGS. 5 to 12. FIG. 5 is a flowchart showing a basic control process performed by the air conditioning ECU 7.

First, when an ignition switch is turned ON (on) to supply a direct current to the air conditioning ECU 7, a routine shown in FIG. 5 is started to initialize (step S1). Subsequently, switch signals from switches such as the temperature setting lever 63 are read (step S2).

Thereafter, sensor signals from the inside air temperature sensor 71, the outside air temperature sensor 72, the solar radiation sensor 73, the post-evaporator temperature sensor 74 and the water temperature sensor 75 are A/D converted, and read (step S3).

Then, a capacity-setting switch position set by the setting unit 7*a* is read (step S300). The capacity-setting switch position is one selected and set from among "high", "middle", and "low" heating levels, "high", "middle", and "low" cooling levels, and a "stop" level.

The term "high" heating level as used herein indicates a heating mode in which the amount of heating of the blown air is largest. The term "middle" heating level as used herein indicates a heating mode in which the amount of heating of the blown air is at a middle level. The term "low" heating level as used herein indicates a heating mode in which the amount of heating of the blown air is smallest.

The term "high" cooling level as used herein indicates a cooling mode in which the amount of heat absorbed from the blown air is largest. The term "middle" cooling level as used herein indicates a cooling mode in which the amount of heat absorbed from the blown air is at a middle level. The term "low" cooling level as used herein indicates a cooling mode in which the amount of heat absorbed from the blown air is smallest. The term "stop" level as used herein indicates a mode in which cooling and heating are stopped.

Then, a capacity of the seat air conditioning unit (auxiliary heater, second heater) 7*b* is determined (step S301). That is, when the heating is set to the "high" level, the auxiliary heating level of the seat air conditioning unit 7*b* is determined as 3 (=3). When the heating is set to the "middle" level, the auxiliary heating level of the seat air conditioning unit 7*b* is determined as 2 (=2). When the heating is set to the "low" level, the auxiliary heating level of the seat air conditioning unit 7*b* is determined as 1 (=1). When the "stop" is set, or when the "high", "middle", or "low" cooling level is set, the auxiliary heating level of the seat air conditioning unit 7*b* is determined as 0 (=0). The auxiliary heating level is used to determine whether turning ON of the engine 1 is required or not, as described later (step S8).

Subsequently, a target temperature (target air outlet temperature TAO) of the air blown out into the vehicle compartment is calculated based on the following formula 1 pre-stored in the ROM (step S4):

$$TAO = Kset \times Tset - KR \times TR - KAM \times TAM - KS \times TS + C \quad \text{(Formula 1)}$$

wherein Tset is a preset temperature set by the temperature setting lever 63, TR is the inside air temperature detected by the inside air temperature sensor 71, TAM is the outside air temperature detected by the outside air temperature sensor 72, and TS is the amount of solar radiation detected by the solar radiation sensor 73. And, Kset, KR, KAM, and KS are gains, and C is a constant for correction.

Figure 6:
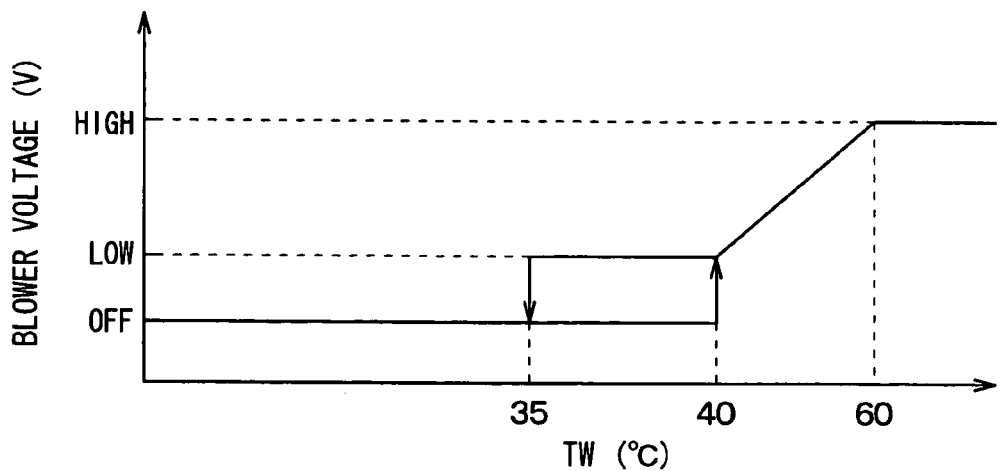
FIG. 6 is a characteristic diagram for determining a blower voltage using the air conditioning ECU shown in FIG. 3.
Figure 7:
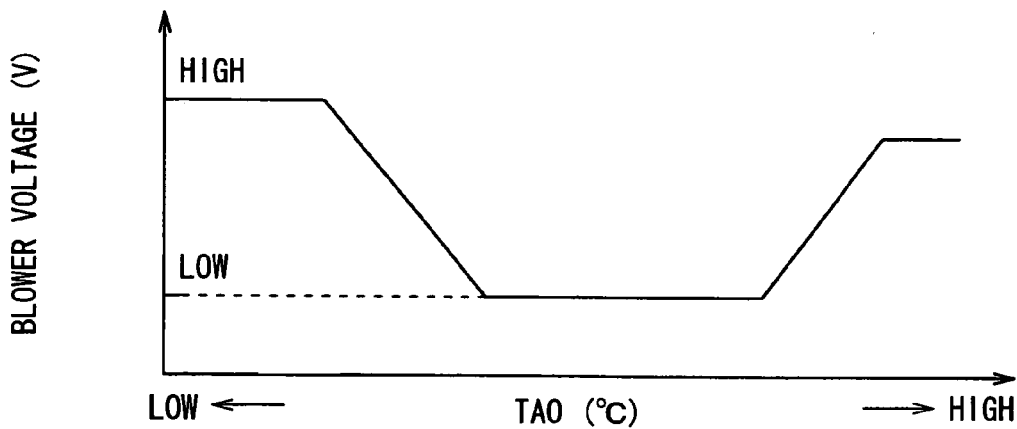
FIG. 7 is a characteristic diagram for determining a blower voltage using the air conditioning ECU shown in FIG. 3.
Figure 8:
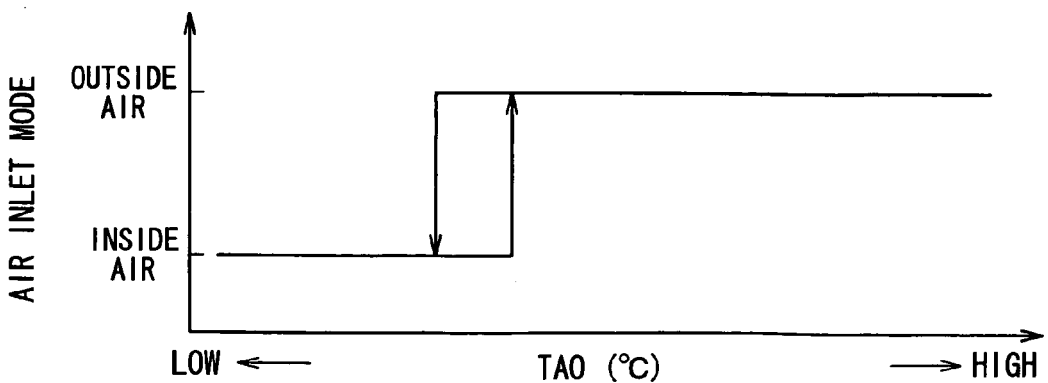
FIG. 8 is a characteristic diagram for determining an air inlet mode using the air conditioning ECU shown in FIG. 3.
Figure 9:
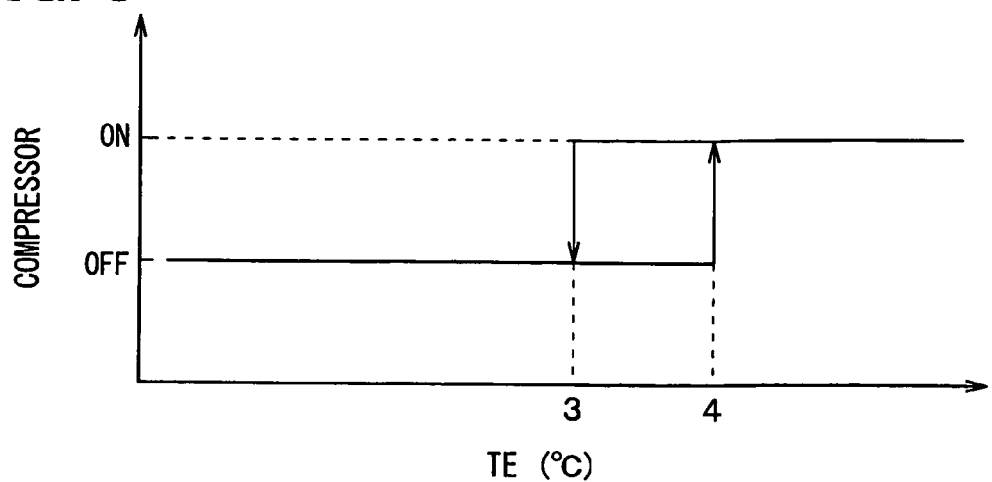
FIG. 9 is a characteristic diagram for determining on/off operation of a compressor using the air conditioning ECU shown in FIG. 3.

Subsequently, warm-up control (blower-operation time delay control) is performed by controlling a blower voltage based on the coolant temperature (TW) detected by the water temperature sensor 75, in accordance with a characteristic diagram pre-stored in the ROM (see FIG. 6). The warm-up control is executed in winter when the outside air temperature is low, or when the air outlet mode is the B/L mode or FOOT mode.

When the coolant temperature (TW) is increased to, for example, 60° C. or more, the blower voltage (a voltage applied to the blower motor 32: V) is determined based on the target air outlet temperature (TAO), in accordance with a characteristic diagram pre-stored in the ROM (see FIG. 7) (step S5).

Subsequently, an air inlet mode is determined based on the target temperature, in accordance with a characteristic diagram (see a map shown in FIG. 8) pre-stored in the ROM (step S6). The air inlet mode is determined to be set as the inside air circulation mode corresponding to the low target air outlet temperature (TAO), or as the outside air introduction mode corresponding to the high target air outlet temperature (TAO).

The inside air circulation mode is an air inlet mode in which the inside/outside air switching damper 13 is set at a position indicated by the alternate long and short dash line of FIG. 2 to introduce the inside air from the inside air inlet 11. The outside air introduction mode is an air inlet mode in which the inside/outside air switching damper 13 is set at a position indicated by the solid line of FIG. 2 to introduce the outside air from the outside air inlet 12.

The air outlet mode is set by any one of air outlet selector switches, including the FACE switch 65, the bi-level (B/L) switch 66, the FOOT switch 67, the F/D switch 68, and the DEF switch 69 on the control panel 60.

Subsequently, a target damper opening degree (SW) of the air mix damper 52 is calculated based on the following formula 2 pre-stored in the ROM (step S7):

$$SW=\{(TAO-TE)/(TW-TE)\}\times 100(\%) \quad \text{(Formula 2)}$$

wherein TE is the post-evaporator temperature detected by the post-evaporator temperature sensor 74, and TW is the coolant temperature detected by the water temperature sensor 75.

When SW is determined by the calculation to be equal to or less than 0% (SW≦0 (%)), the air mix damper 52 is controlled to be located in such a position (MAXCOOL position) that allows all the cool air from the evaporator 45 to bypass the heater core 51. When SW is determined by calculation to be equal to or more than 100% (SW≧100 (%)), the air mix damper 52 is controlled to be located in such a position (MAXHOT position) that allows all the cool air from the evaporator 45 to pass through the heater core 51.

When SW is determined by calculation to be more than 0 (%) and less than 100 (%) (0 (%)<SW<100 (%)), the air mix damper 52 is controlled to be located in such a position that allows part of the cool air from the evaporator 45 to pass through the heater core 51, while allowing the remaining cool air to bypass the heater core 51.

Figure 11:
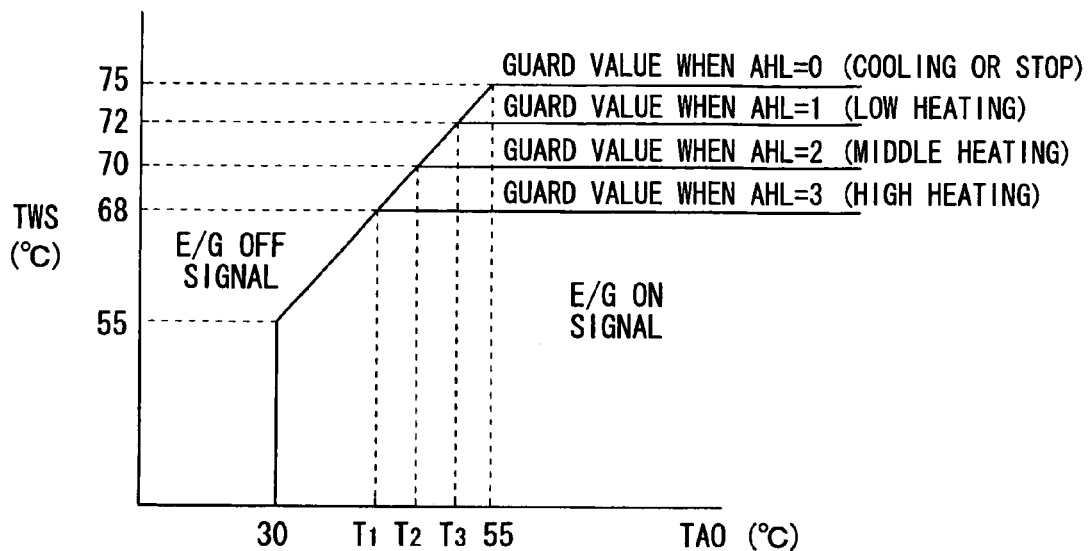
FIG. 11 is a characteristic diagram used for determining a preset coolant temperature (TWS) in step S8 shown in FIG. 5.

Subsequently, the preset coolant temperature (TWS) to be used in next step S8 is determined (step S302). The preset coolant temperature (TWS) is set to be a different value for each auxiliary heating level as shown in FIG. 11. The details of the preset coolant temperature (TWS) will be described later. Step S302 corresponds to "adjustment means" in this embodiment.

Figure 10:
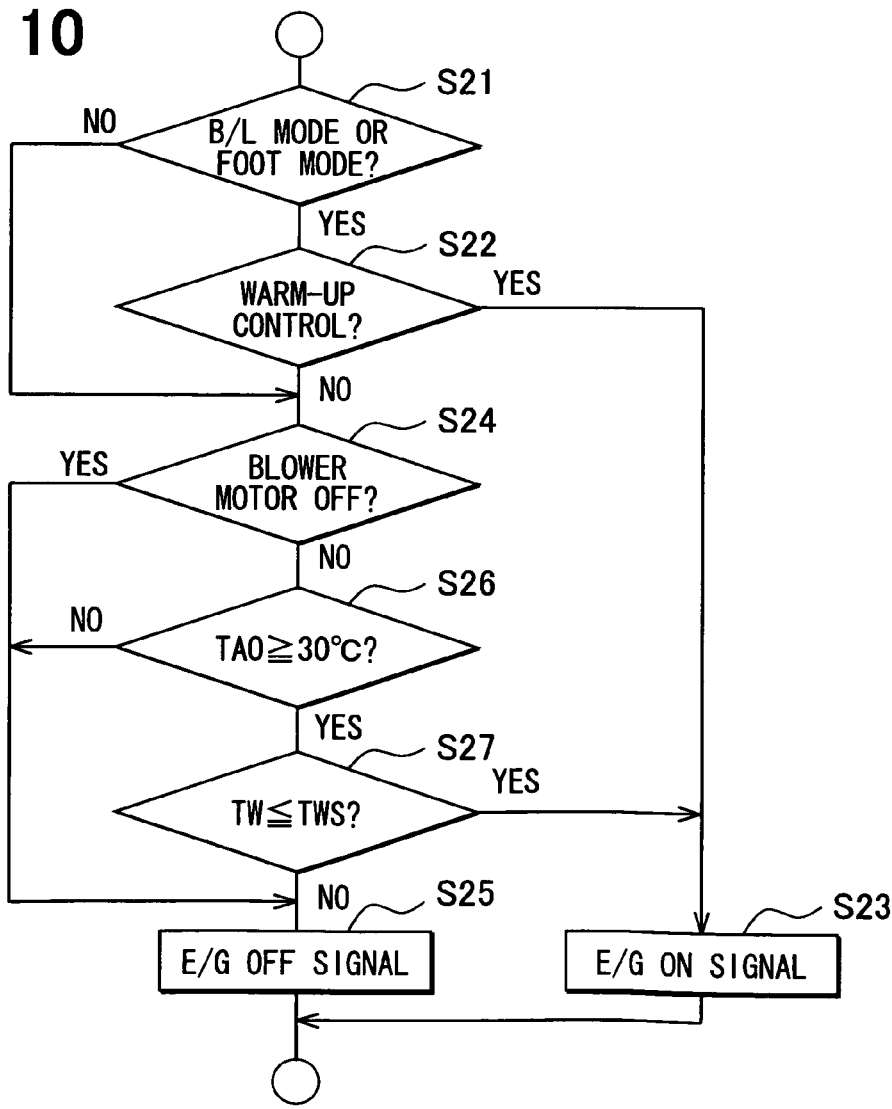
FIG. 10 is a flowchart showing detail operation of step S8 shown in FIG. 5.

Then, it is determined whether the ON of the engine 1 (E/G) is required or not in step S8. That is, a subroutine shown in FIG. 10 is called, and determination of an engine operation requirement is performed. The determination involves determining whether or not an engine operation requirement (E/G ON) signal for requiring the startup of the engine 1 is output to the engine ECU 9 from the air conditioning ECU 7, or whether or not an engine stop requirement (E/G OFF) signal for requiring stopping of the operation of the engine 1 is output to the engine ECU 9. The details of the determination process will be described below.

Subsequently, when the A/C switch 61 is turned ON, an operating state of the compressor 41 is determined. That is, the startup and stopping of the compressor 41 is determined based on a post-evaporator temperature (TE) detected by the post-evaporator temperature sensor 74 (step S9). Specifically, as shown in a characteristic diagram pre-stored in the ROM (see FIG. 9), when the post-evaporator temperature (TE) detected by the post-evaporator temperature sensor 74 is equal to or higher than a first frost formation temperature (for example, 4° C.), the electromagnetic clutch 46 is controlled to be energized (turned ON) so as to start up (turn ON) the compressor 41, thereby operating the refrigeration cycle 40. That is, in this case, the evaporator 45 is operated.

When the post-evaporator temperature (TE) detected by the post-evaporator temperature sensor 74 is equal to or less than a second frost formation temperature (for example, 3° C.) that is lower than the first frost formation temperature, the electromagnetic clutch 46 is controlled to be unenergized (turned OFF) so as to stop (turn OFF) the operation of the compressor 41, thereby stopping the operation of the refrigeration cycle 40. That is, in this case, the air cooling operation of the evaporator 45 is stopped.

Then, control signals are output to the actuators 14, 22, 53, the blower driving circuit 33, and the clutch driving circuit 47 so as to obtain the respective control states calculated or determined in steps S5 to S9 (step S10). The control process in step S10 corresponds to temperature control means in this embodiment.

After a time t (for example, 0.5 sec to 2.5 sec) which is a control cycle time has elapsed in step S11, the operation returns to the control process of step S2.

Now, the control process of the determination of the engine operation requirement (step S8) will be described in detail based on FIGS. 10 and 11. FIG. 10 is a flowchart showing the control process of the engine operation requirement determination. The flowchart shown in FIG. 10 is executed when the air amount switching lever 64 is set to an AUTO position.

First, it is determined whether or not the air outlet mode is set to one of the B/L mode and the FOOT mode in the air conditioning ECU 7 (step S21). That is, it is determined whether the B/L switch 66 or the FOOT switch 67 is operated (e.g., pushed) or not (step S21).

If the result of the determination is "NO" at step S21, the operation proceeds to step S24. If the result of the determination is "YES" in step S21, it is determined whether the blower-operation time delay control (warm-up control) is being performed or not (step S22). If the result of the determination is "YES", the E/G ON signal is sent to the engine ECU 9 (step S23). Thereafter, the operation leaves the subroutine.

If the result of the determination is "NO" in step S22, it is determined whether or not the blower motor 32 is turned OFF (whether or not the amount of blown air is zero) (step S24). If the result of the determination is "YES", the E/G OFF signal is sent to the engine ECU 9 (step S25). Thereafter, the operation leaves the subroutine.

If the result of the determination is "NO" in step S24, it is determined whether or not the target air outlet temperature (TAO) determined in step S4 shown in FIG. 5 is equal to or more than a predetermined temperature (for example, 30° C.) (step S26). If the result of the determination is "NO", the operation will proceed to control process in step S25, where the E/G OFF signal is sent to the engine ECU 9.

If the result of the determination is "YES" in step S26, it is determined whether or not the coolant temperature (TW) detected by the water temperature sensor 75 is equal to or less than the preset coolant temperature (TWS) (step S27).

If the result of the determination is "NO" in step S27, the operation will proceed to the control process in step S25, where the E/G OFF signal is sent to the engine ECU 9.

If the result of the determination is "YES" in step S27, the operation will proceed to the control process in step S23, where the E/G ON signal is sent to the engine ECU 9. Steps S27 and S23 constitute signal output means for outputting a requirement signal for requiring the startup of the engine when the temperature of coolant of the engine is determined to be lower than a threshold, in this embodiment.

The preset coolant temperature (TWS) is changed according to the target air outlet temperature (TAO) and the auxiliary heating level (AHL) as shown in the characteristic diagram pre-stored in the ROM (see FIG. 11).

Specifically, when the auxiliary heating level (AHL) is 3 (=3) in a case where 30<TAO<T1 (for example, 42), the preset coolant temperature (TWS) gradually increases from 55 to 68 (maximum value), whereas in a case where T1<TAO, the preset coolant temperature (TWS) keeps at the maximum value (guard value) of 68.

When the auxiliary heating level is 2 (=2), in a case where 30<TAO<T2 (for example, 48), the preset coolant temperature (TWS) gradually increases from 55 to 70 (maximum value), whereas in a case where T2<TAO, the preset coolant temperature (TWS) keeps at the maximum value (guard value) of 70.

When the auxiliary heating level is 1 (=1), in a case where 30<TAO<T3 (for example, 52), the preset coolant temperature (TWS) gradually increases from 55 to 72 (maximum value), whereas in a case where T3<TAO, the preset coolant temperature (TWS) keeps at the maximum value (guard value) of 72.

When the auxiliary heating level is 0 (=0), in a case where 30<TAO<55, the preset coolant temperature (TWS) gradually increases from 55 to 75 (maximum value), whereas in a case where 55<TAO, the preset coolant temperature (TWS) keeps at the maximum value (guard value) of 75.

In this embodiment, the terms T1, T2, T3, and 55 correspond to a second temperature (e.g., ° C.), and are different for the respective auxiliary heating levels. The temperature values T1, T2, T3, and 55 will be hereinafter referred to as a Ty1 on the whole.

When the target air outlet temperature (TAO) is an intermediate temperature (that is, 30<TAO<Ty1), a gradient of the TAO to the TWS (TWS/TAO) has the same value regardless of the auxiliary heating level, as shown in FIG. 11.

That is, when the target air outlet temperature (TAO) is any an intermediate temperature, the gradient of the TAO to the TWS (TWS/TAO) for each auxiliary heating level has the same value.

As mentioned above, as the auxiliary heating level (that is, an amount of heat generated by the auxiliary heater) is increased, the preset coolant temperature (TWS) is set lower. The preset coolant temperature (TWS: threshold) is selected in accordance with the auxiliary heating level (that is, the operating state of the auxiliary heater). It is determined whether or not a detection coolant temperature (TW) detected by the water temperature sensor 75 is equal to or less than the preset coolant temperature (TWS) selected. In response to the result of the determination, the E/G OFF signal or E/G ON signal is sent.

The E/G ON signal corresponds to a requirement signal for requiring the startup of the engine, in this embodiment. The temperature value "30" (target air outlet temperature (TAO)) as used herein corresponds to a first temperature, in this embodiment.

Figure 12:
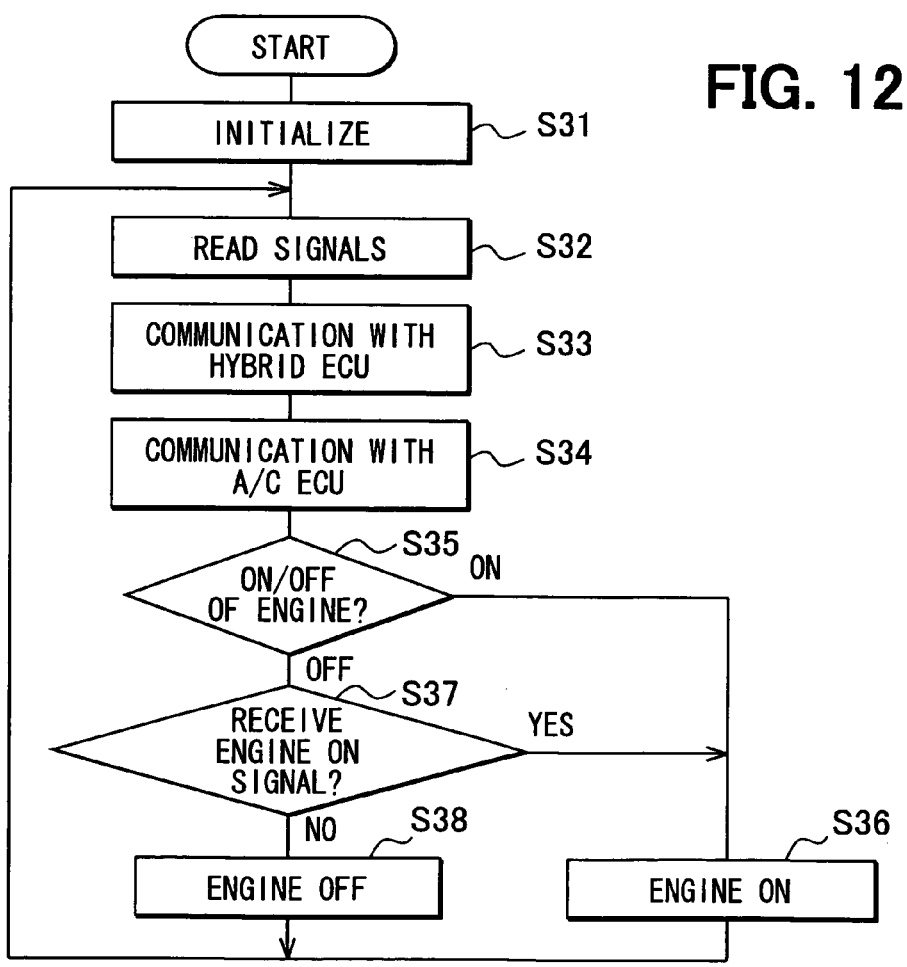
FIG. 12 is a flowchart showing a control process performed by an engine ECU shown in FIG. 1.

Now, control process performed by the engine ECU 9 of this embodiment will be described based on FIG. 12. FIG. 12 is a flowchart showing the basic control process performed by the engine ECU 9.

First, when the ignition switch is turned ON to supply the direct current to the engine ECU 9, the routine shown in FIG. 12 is started up to initialize (step S31). Subsequently, the sensor signals are read in (step S32).

Then, communication (transmission and reception) of the signal with the hybrid ECU 8 is performed (step S33). Subsequently, communication (transmission and reception) of the signal with the air conditioning ECU 7 is performed (step S34). Thereafter, based on the sensor signals, it is determined whether the engine 1 should be turned on or off (step S35). If the result of the determination is "ON", a control signal is output to the engine starter 3 including the motor for startup and an ignition device so as to start up (turn on) the engine 1 (step S36). Then, the control operation returns to step S32.

If the result of the determination is "OFF" in step S35, it is determined whether or not the E/G ON signal for requiring the startup of the engine 1 is received from the air conditioning ECU 7 (step S37). If the result of the determination is "NO", since the E/G OFF signal is received from the air conditioning ECU 7, a control signal is output to the engine starter 3 so as to stop (turn OFF) the operation of the engine 1 (step S38). Then, the operation returns to step S32.

If the result of the determination is "YES" in step S37, the operation proceeds to step S36, and a control signal is output to the engine starter 3 so as to start up (turn ON) the engine 1.

Now, an operation of the air conditioner of this embodiment will be described below.

In this embodiment, the target air outlet temperature (TAO) of the air to be blown out from the air outlet of the air conditioning case 10 toward the vehicle interior is determined by using a preset temperature (Tset) set by the temperature setting lever 63, an inside air temperature (TR) detected by the inside air temperature sensor 71, an outside air temperature (TAM) detected by the outside air temperature sensor 72, and a solar radiation amount (TS) detected by the solar radiation sensor 73.

When the target air outlet temperature (TAO) determined by the air conditioning ECU 7 is lower than a predetermined temperature (for example, 30 ° C.), or/and when the coolant temperature (TW) detected by the water temperature sensor 75 is higher than the preset coolant temperature (TWS), the engine 1 is not started up.

In contrast, when the target air outlet temperature (TAO) is equal to or higher than the predetermined temperature (for example, 30° C.) and the coolant temperature (TW) detected by the water temperature sensor 75 is below the preset coolant temperature (TWS), the engine 1 is started up by the engine starter 3. Thus, the compressor 41 driven via the belt by the engine 1 can be started up to operate the refrigeration cycle 40.

Together with this, the engine 1 is operated to rapidly increase the temperature of coolant flowing back into the water jacket of the engine 1, so that the temperature of the coolant supplied to the heater core 51 is kept at a predetermined coolant temperature (for example, about 80° C.).

Thus, the air drawn into the air conditioning case 10 is cooled to, for example, about 4° C. while passing through the evaporator 45, is heated (reheated) while passing through the heater core 51, and then is blown out into the vehicle compartment. Thus, the temperature of air blown into the vehicle compartment can approach the target air outlet temperature (TAO) at an early stage.

In this embodiment, the higher the auxiliary heating level (that is, the more the amount of heat generated in the seat air conditioning unit 7b), the lower the maximum value (guard value) of the preset coolant temperature (TWS). Thus, the higher auxiliary heating level makes it more difficult to start up the engine 1. Together with this, it can ensure the heating performance, while suppressing the deterioration of the fuel efficiency of the hybrid vehicle 5.

Second Embodiment

Figure 13:
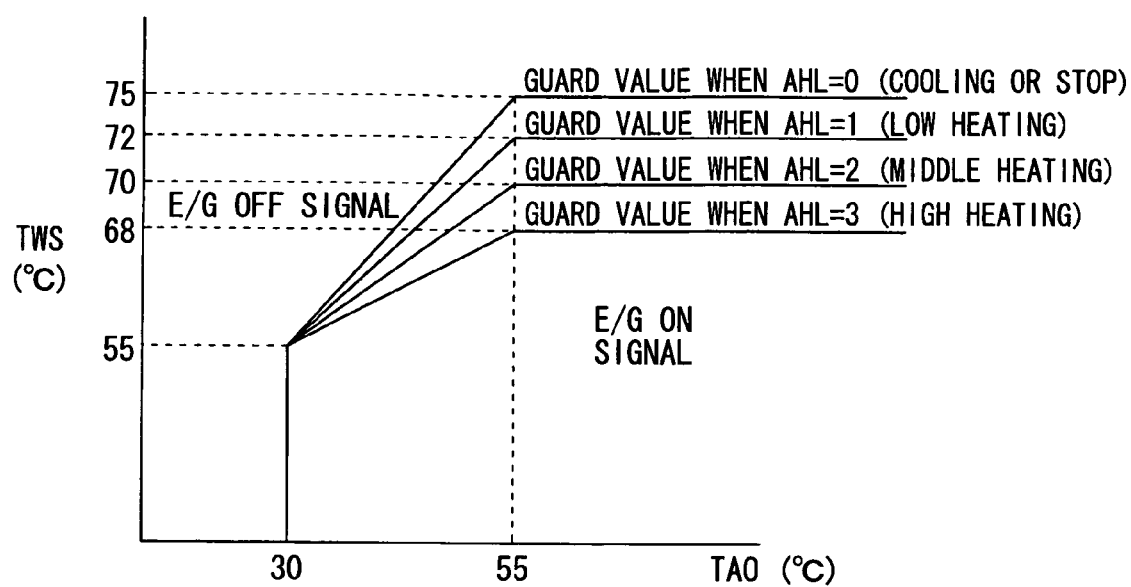
FIG. 13 is a characteristic diagram used for determining a preset coolant temperature (TWS) in a second embodiment of the invention.

In the above-described first embodiment as mentioned above, the gradient (TWS/TAO) of the target air outlet temperature (TAO) with respect to the preset coolant temperature (TWS) is the same or constant regardless of the auxiliary heating level as shown in FIG. 11. Instead of this, as shown in FIG. 13, the gradient (TWS/TAO) of the target air outlet temperature (TAO) with respect to the preset coolant temperature (TWS) may be set to be different for each auxiliary heating level.

Specifically, in a case of 30<TAO<55, the gradient (TWS-fTAO) becomes different for each auxiliary heating level, whereas in a case of 55<TAO, the preset coolant temperature (TWS) takes the maximum value (guard value) that is different for each auxiliary heating level. Each of the maximum values (guard value such as 75, 72, 70, 68) is the same as the corresponding one in the first embodiment as described above.

In the second embodiment, the preset coolant temperature (TWS) can be set in detail for each auxiliary heating level, thereby executing the processing of the engine operation requirement determination (step S8) with high accuracy.

In the second embodiment, the other parts may be the same as those of the above-described first embodiment.

Third Embodiment

Figure 14:
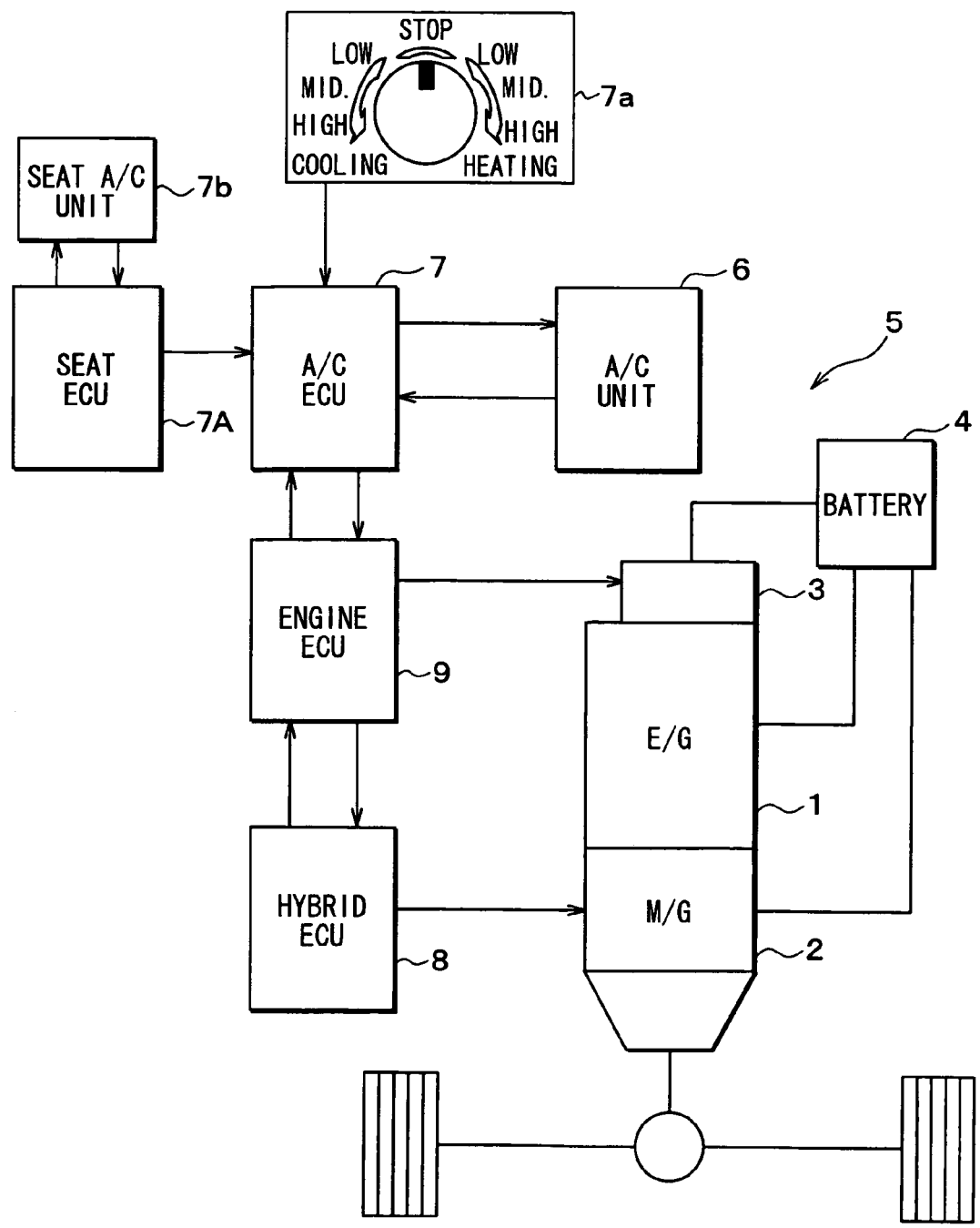
FIG. 14 is a block diagram showing a schematic configuration of a hybrid vehicle according to a third embodiment of the invention.

Although in the above-described first embodiment, the setting unit $7a$ is directly connected to the seat ECU $7A$, and the output signal from the setting unit $7a$ is directly input into the seat ECU $7A$, the invention is not limited thereto. As shown in FIG. 14, the air conditioning ECU 7 may be located between the setting unit $7a$ and the seat ECU $7A$, and the output signal from the setting unit $7a$ may be input to the seat ECU $7A$ via the air conditioning ECU 7.

In the third embodiment, the other parts may be the same as those of the above-described first or second embodiment.

Fourth Embodiment

Although in the above-described first embodiment, the seat air conditioning unit $7b$ is used as the auxiliary heater (second heater), the invention is not limited thereto. Instead of this, in this fourth embodiment, a steering heater $7c$ may be used as the auxiliary heater (second heater).

The steering heater $7c$ is a sheet-like electric heater disposed on the outer surface side of a steering. The steering heater $7c$ heats the outer surface side of the steering when being energized.

Figure 15:
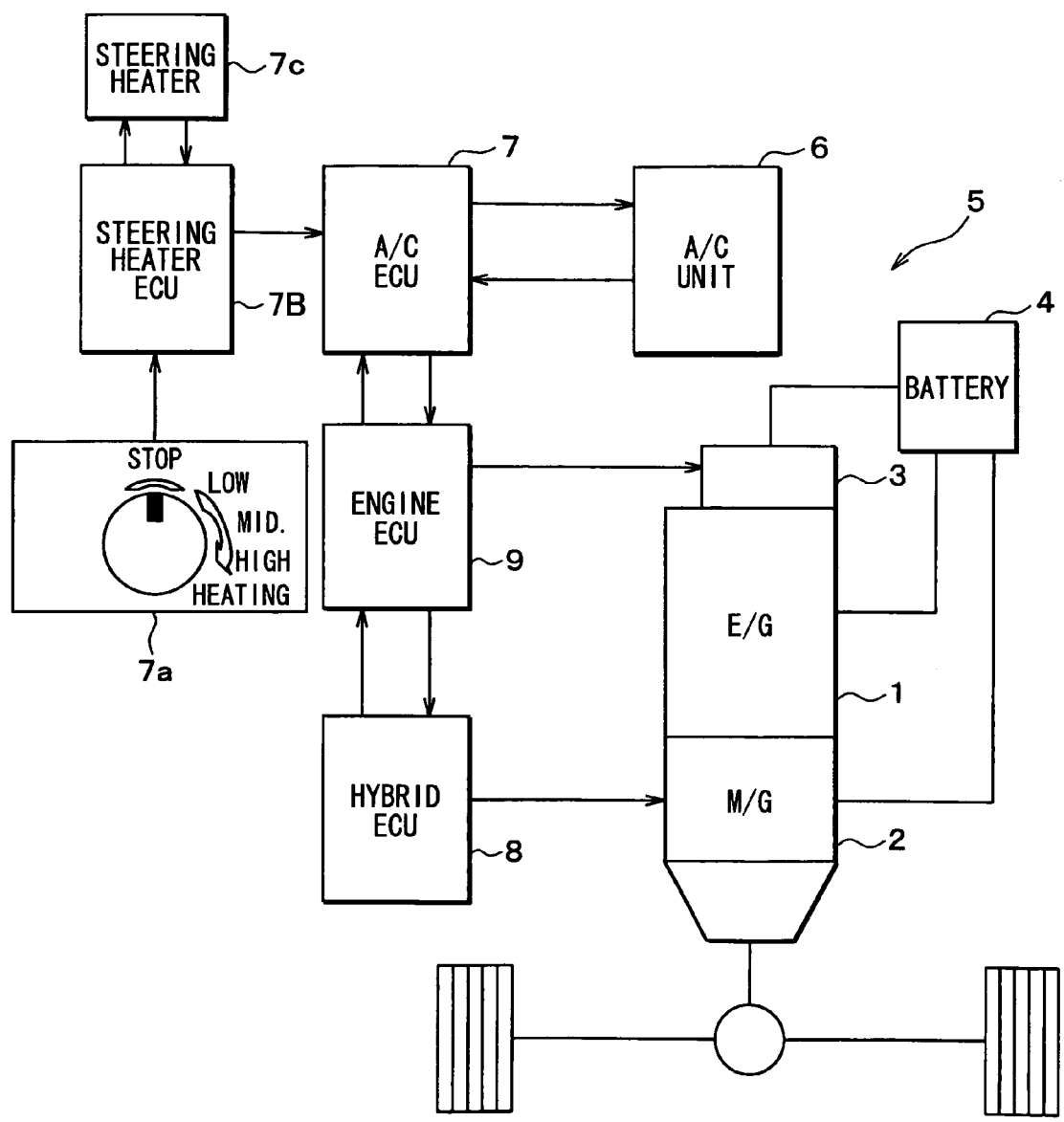
FIG. 15 is a block diagram showing a schematic configuration of a hybrid vehicle according to a fourth embodiment of the invention.

In this embodiment, as shown in FIG. 15, a steering heater ECU $7B$ is used instead of the seat ECU $7A$. The steering heater ECU $7B$ is connected to the setting unit $7a$. The steering heater ECU $7B$ adjusts the current passing through the steering heater $7c$ based on the output signal from the setting unit $7a$ thereby to change the amount of heat generated from the steering heater $7c$ (that is, the heating level) in three levels, namely, "high", "middle", and "low" levels.

The setting unit $7a$ of this embodiment can be operated to change only the heating level in three levels, namely, the "high", "middle", and "low" levels, and not to set the cooling level. In FIG. 15, the same elements as those in FIG. 1 are designated by the same reference numerals, and a description thereof will be omitted below.

Figure 16:
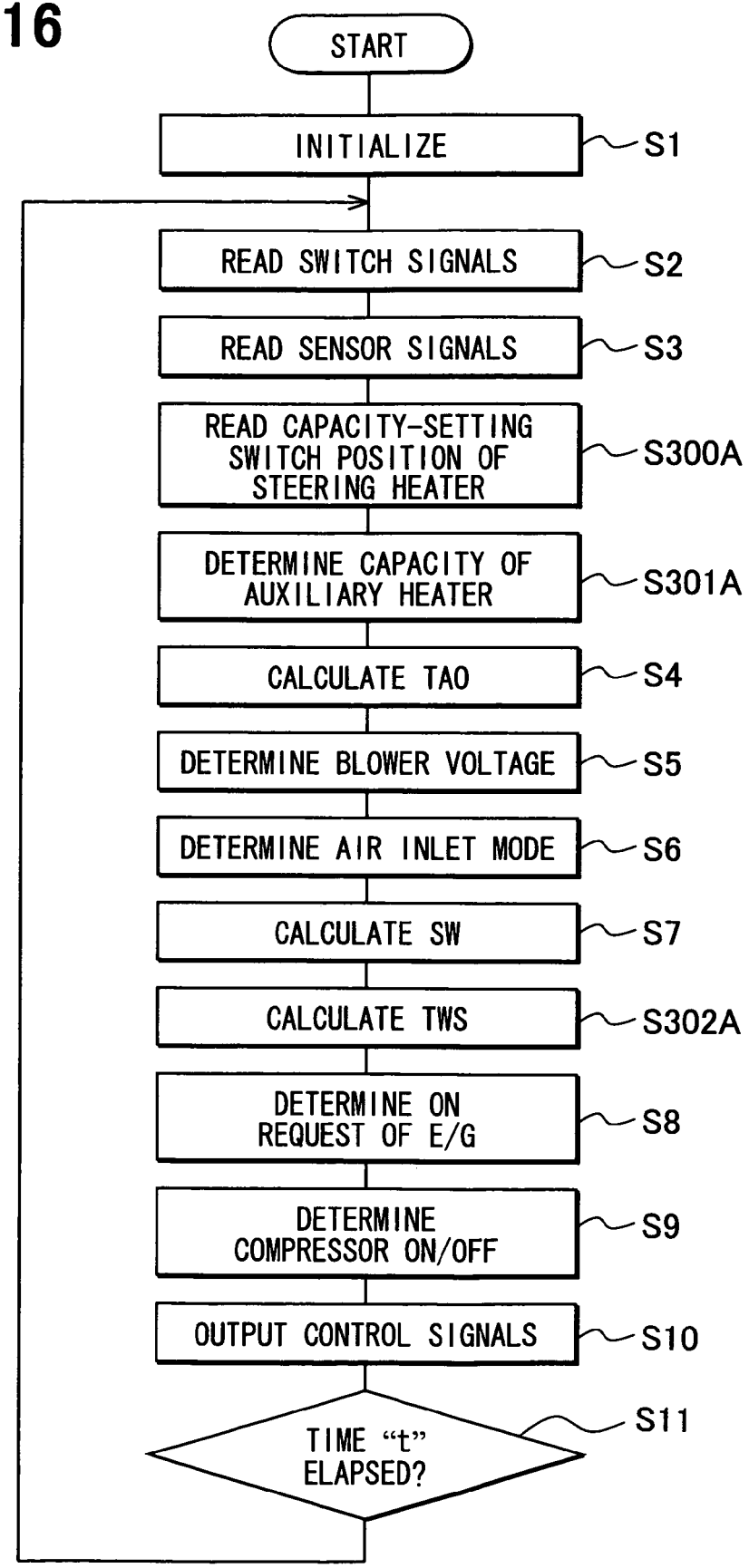
FIG. 16 is a flowchart showing a control process performed by an engine ECU of the fourth embodiment.

In the fourth embodiment, control process of the air conditioning ECU 7 employs a flowchart shown in FIG. 16, instead of that shown in FIG. 5. In FIG. 16, step S300A, step S301A, and step S302A are used instead of step S300, step S301, and step S302 shown in FIG. 5, respectively. Step(s) other than steps S300A, S301A, and S302A are the same as those indicated by the same reference numerals in FIG. 5, and a description thereof will be omitted.

In step S300A, a capacity-setting switch position (that is, "high", "middle", "low", or "stop" heating position) set by the setting unit $7a$ is read in.

In step S301A, a capacity of the steering heater $7c$ (auxiliary heater) is determined. That is, when the switch position is set to the "high" heating position, the auxiliary heating level is determined as 3 (=3). When the switch position is set to the "middle" heating position, the auxiliary heating level is determined as 2 (=2). When the switch position is set to the "low" heating position, the auxiliary heating level is determined as 1 (=1). When the switch position is set to the "stop" heating position, the auxiliary heating level is determined as 0 (=0).

In step S302A, like the above-described first embodiment, a preset coolant temperature (TWS) is determined. That is, the preset coolant temperature (TWS) is set to be different for each auxiliary heating level as shown in FIG. 13. Instead of the characteristic map shown in FIG. 13, the characteristic map shown in FIG. 11 may be used to set the preset coolant temperature (TWS).

Fifth Embodiment

In the above-described fourth embodiment, as shown in FIG. 15, the setting unit $7a$ is directly connected to the steering heater ECU $7B$. Instead of this, as shown in FIG. 17, the air conditioning ECU 7 may be located between the steering heater ECU $7B$ and the setting unit $7a$, so that the output signal from the setting unit $7a$ may be inputted into the steering heater ECU $7B$ via the air conditioning ECU 7.

Figure 17:
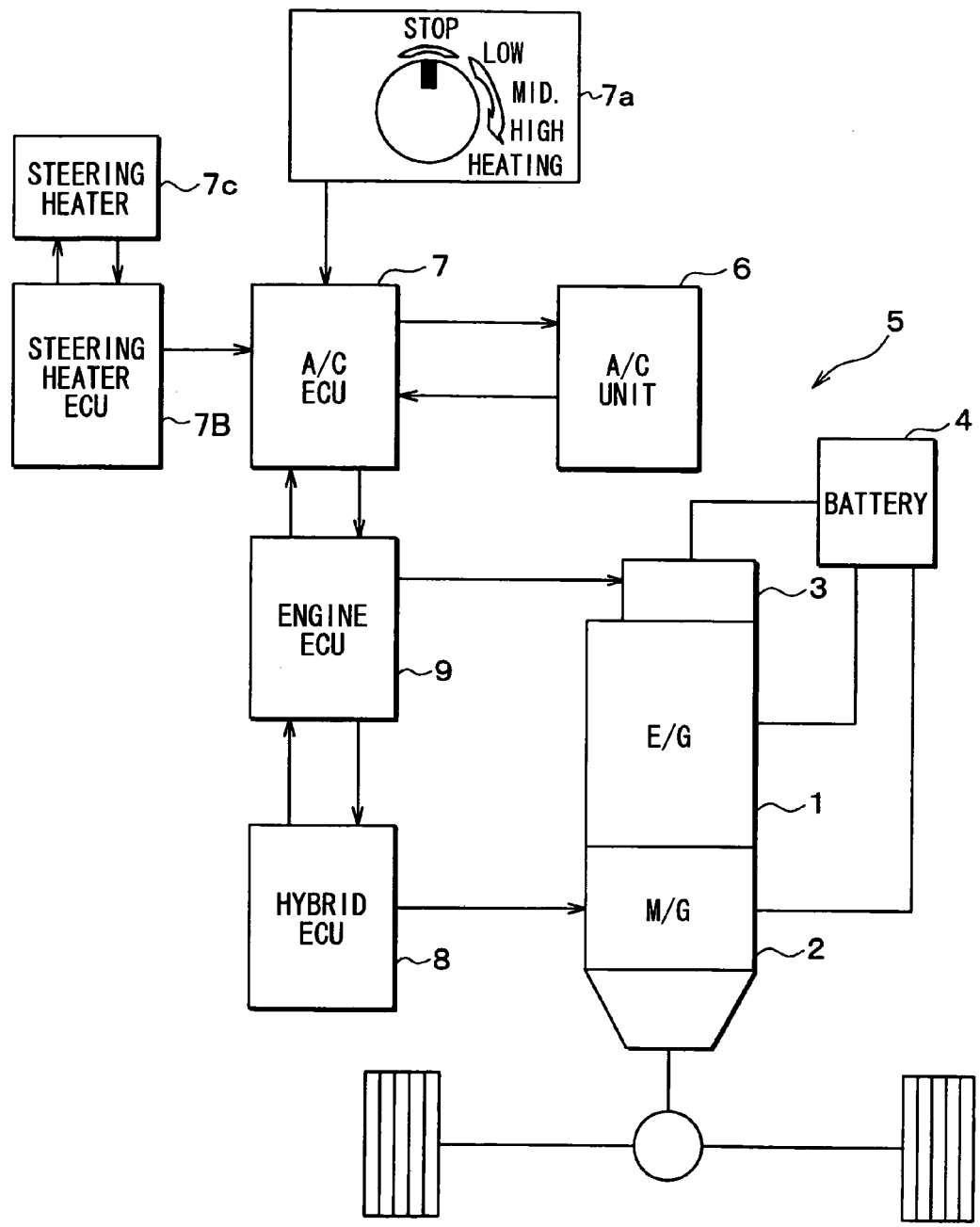
FIG. 17 is a block diagram showing a schematic configuration of a hybrid vehicle according to a fifth embodiment of the invention.

In FIG. 17, the same elements as those in FIG. 15 are designated by the same reference numerals, and detail description thereof will be omitted.

Sixth Embodiment

Figure 18:
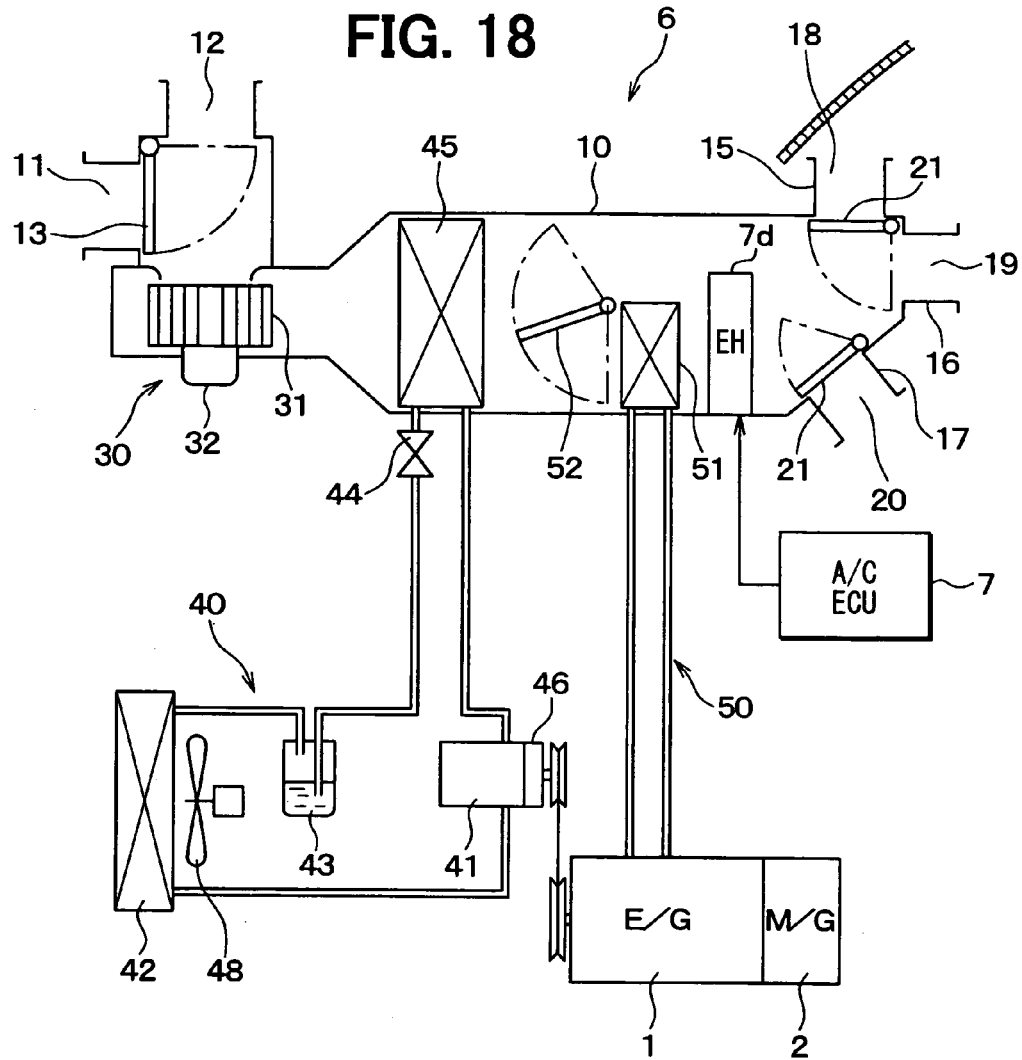
FIG. 18 is a diagram showing a structure of an air conditioning unit of a sixth embodiment of the invention.

In the above-described first embodiment, the seat air conditioning unit $7b$ is used as the auxiliary heater. Instead of this, in this sixth embodiment, an electric heater $7d$ (EH) that operates in an auxiliary manner to support the heater core 51 is used as the auxiliary heater. The electric heater $7d$ is disposed on a downstream side of the heater core 51 to heat the warm air having passed through the heater core 51 as shown in FIG. 18.

Figure 19:
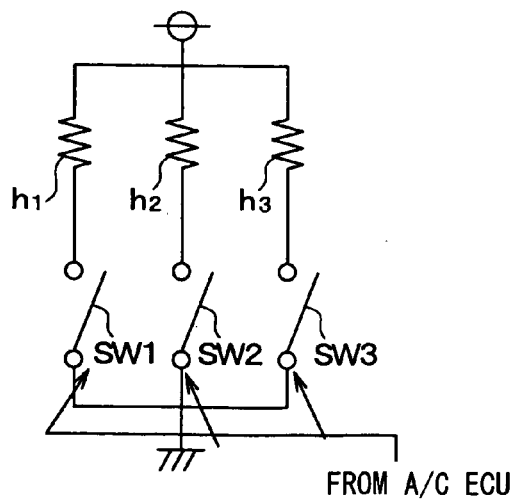
FIG. 19 is a diagram showing a configuration of an electric heater shown in FIG. 18.

The electric heater $7d$, as shown in FIG. 19, includes heater wires h1, h2, and h3 constructed of nichrome wires and the like. The heater wires h1, h2, and h3 are connected in parallel between a power supply and the ground. Switch elements SW1, SW2, and SW3 are provided in the heater wires h1, h2, and h3, respectively. The switch elements SW1, SW2, and SW3 start or stop the energization of the heater wires h1, h2, and h3 from the power supply by being turned on or off. The on/off of the switch elements SW1, SW2, and SW3 is controlled by the air conditioning ECU 7.

Figure 20:
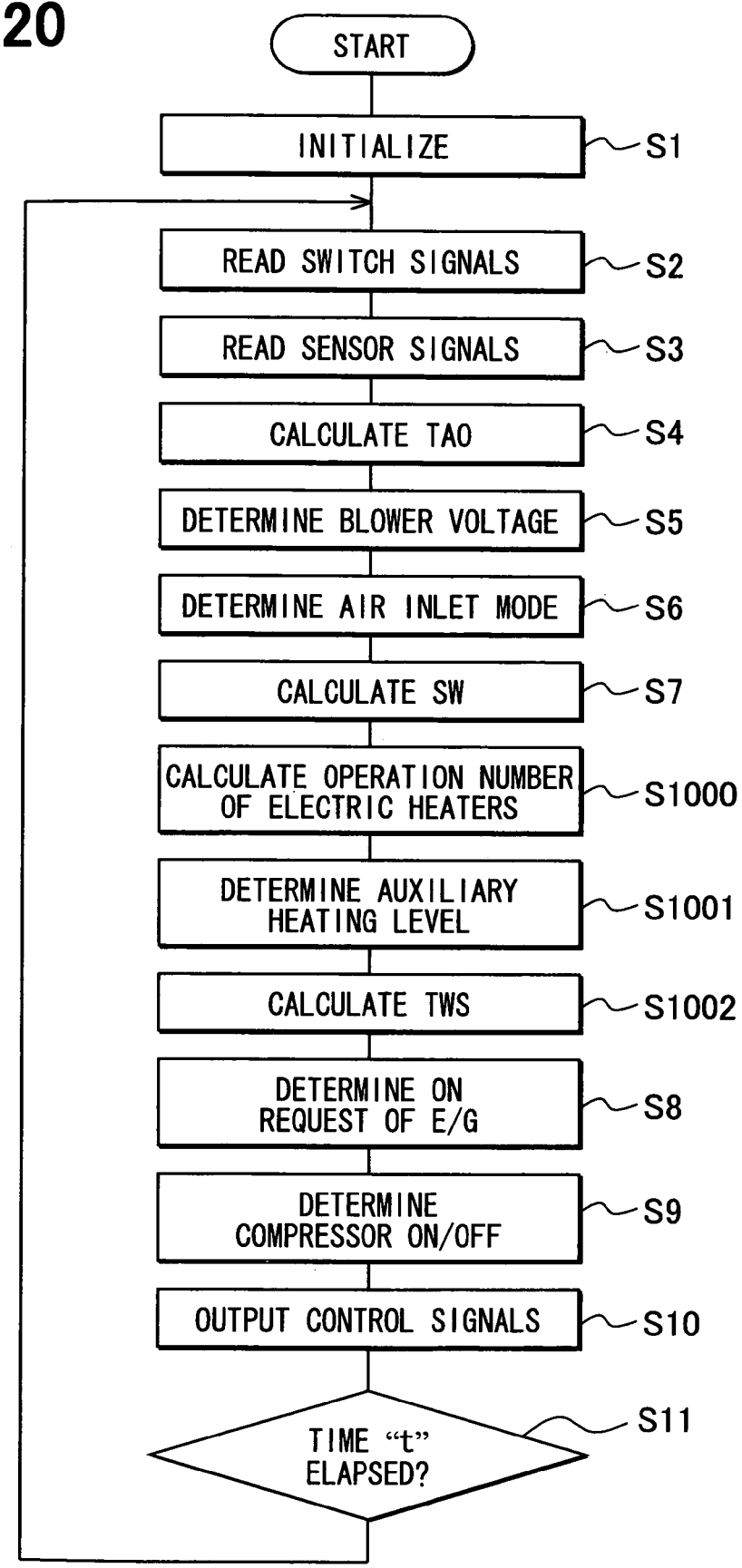
FIG. 20 is a flowchart showing a control process performed by an engine ECU of the sixth embodiment.

In this embodiment, control process of the air conditioning ECU 7 employs a flowchart shown in FIG. 20, instead of that shown in FIG. 5 of the first embodiment. In FIG. 20, steps S1 to S11 have the same procedures as those in steps S1 to S11 in FIG. 5.

Figure 21:
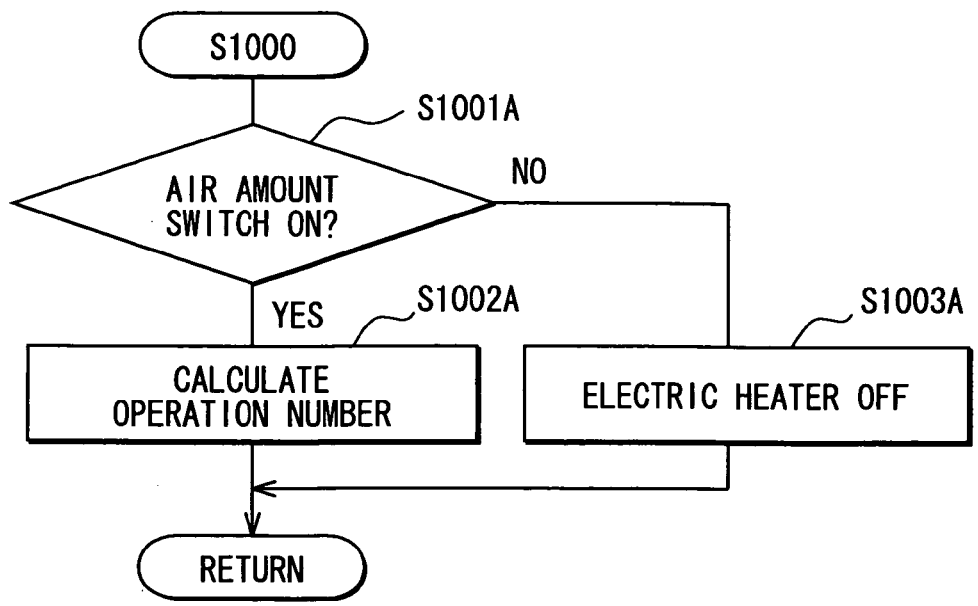
FIG. 21 is a flowchart showing a detail control of the electric heaters, shown in FIG. 20.

In this embodiment, after the processing in steps S1 to S7, calculation process of the operation number of the electric heaters $7d$ to be operated is performed (step S1000). In the calculation processing of step S1000, as shown in FIG. 21, it is determined whether the air amount switch is turned ON or not (step S1001A). That is, when the air amount switching lever 64 is set to any one of "AUTO", "LOW", "MIDDLE", and "HIGH" other than "OFF", the air amount switch is determined to be turned ON, as "YES" at step S1001A. At this time, the operation number of the electric heaters 7d to be operated, that is, the capacity of the electric heaters 7d is calculated based on the coolant temperature (TW).

Figure 22:
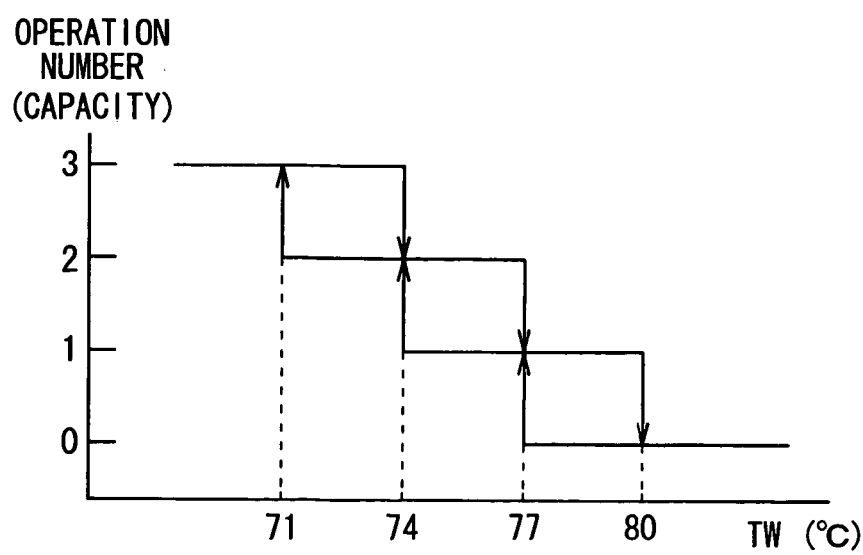
FIG. 22 is a characteristic diagram for determining the operation number of the electric heaters to be operated in the above sixth embodiment.

As shown in the characteristic map in FIG. 22, when the coolant temperature (TW)<71, the operation number of the electric heaters 7d to be operated is three. When 71<the coolant temperature (TW) <74, the operation number of the electric heaters 7d to be operated is two. When 74<the coolant temperature (TW) <77, the operation number of the electric heaters 7d to be operated is one. When 77<the coolant temperature (TW), the number of the electric heaters 7d to be operated is zero.

When the air amount switching lever 64 is set to "OFF", the air amount switch is determined to be turned OFF, and the determination of step S1001 is NO. Then, the electric heater 7d is turned OFF, that is, the number of the operated electric heaters 7d is zero.

In this way, when the operation number of the electric heaters 7d to be operated is determined, the switch elements SW1, SW2, and SW3 are turned ON/OFF in response to the operation number determined. The amount of heat generated from the warm air having passed through the heater core 51 is changed according to the number of the operated electric heaters 7d.

After the calculation processing (step S1000) of the operation number of the electric heaters 7d, a capacity (heating level) of the auxiliary heater is determined (step S1001 of FIG. 20). That is, when the operation number of the electric heaters 7d is three, the auxiliary heating level is determined as 3 (=3). When the operation number of the electric heaters 7d is two, the auxiliary heating level is determined as 2 (=2). When the operation number of the electric heaters 7d is one, the auxiliary heating level is determined as 1 (=1). When the operation number of the electric heaters 7d is zero, the auxiliary heating level is zero (=0).

Then, like the above-described first embodiment, a preset coolant temperature (TWS) is determined according to the auxiliary heating level (step S1002). The other control processes are the same as those of the first embodiment, and thus will be omitted.

Seventh Embodiment

Figure 23:
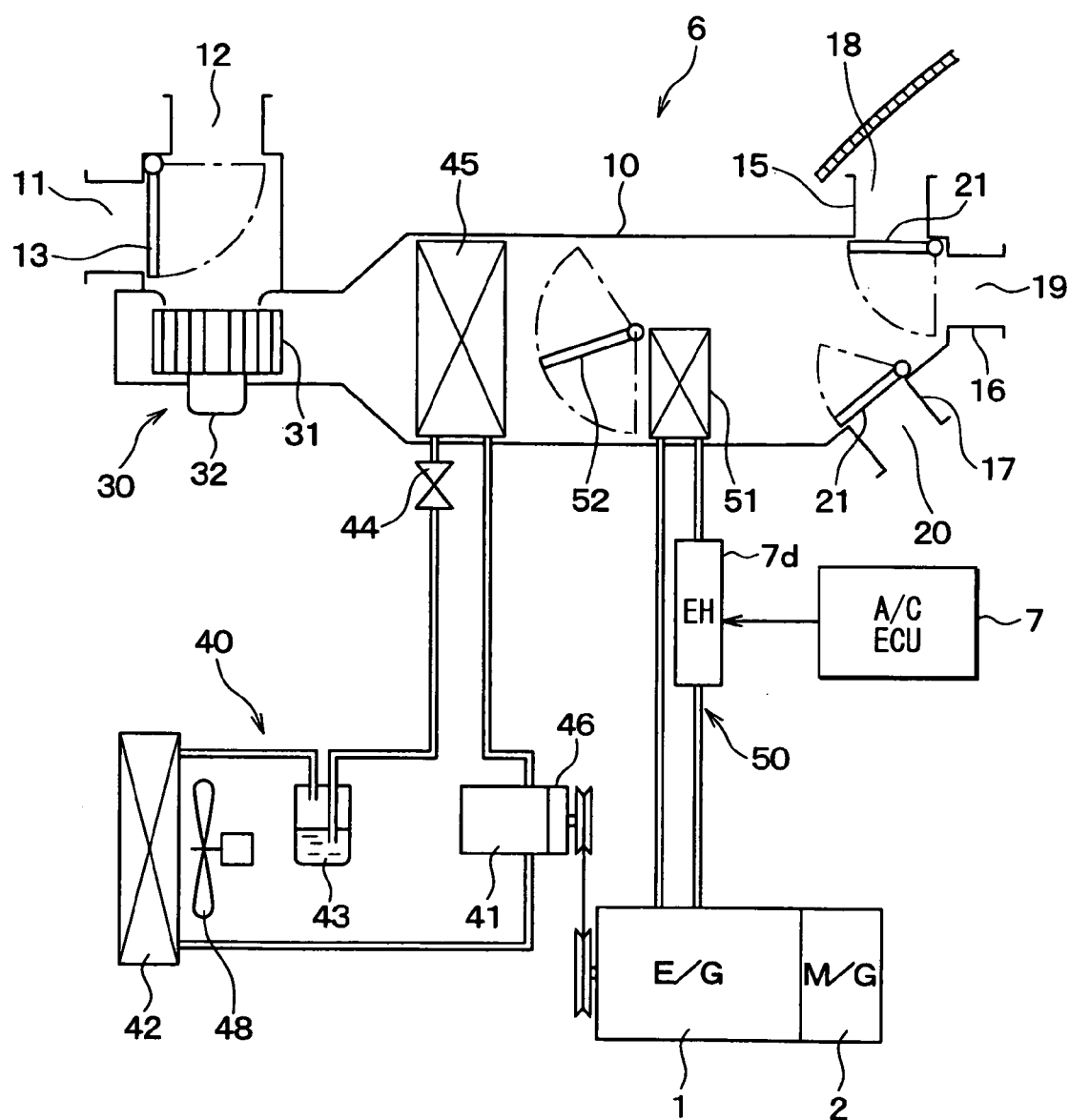
FIG. 23 is a diagram showing a structure of an air conditioning unit of a seventh embodiment of the invention.

In the above-described sixth embodiment, the electric heater 7d serving as the auxiliary heater according to the invention is used to directly heat the warm air having passed through the heater core 51. Instead of this, as shown in FIG. 23, the electric heater (EH) 7d may be disposed in a coolant circuit 50 thereby to heat the coolant by the electric heater 7d so as to increase the heating level of the heater core 51. In this case, the electric heater 7d is used to indirectly heat air passing through the air conditioning case 10.

Like the electric heater 7d of the above-described sixth embodiment, the electric heater 7d of this embodiment includes plural heater wires h1 to h3, switch elements SW1 to SW3, and the like. The electric heater 7d is controlled by the air conditioning ECU 7 to be energized, similarly to the sixth embodiment.

Eighth Embodiment

In the above-described first to seventh embodiments, the characteristic of the preset coolant temperature (TWS) that changes according to the target air outlet temperature (TAO) is changed for each auxiliary heating level. Instead of this, this embodiment may be changed as follows.

Figure 24:
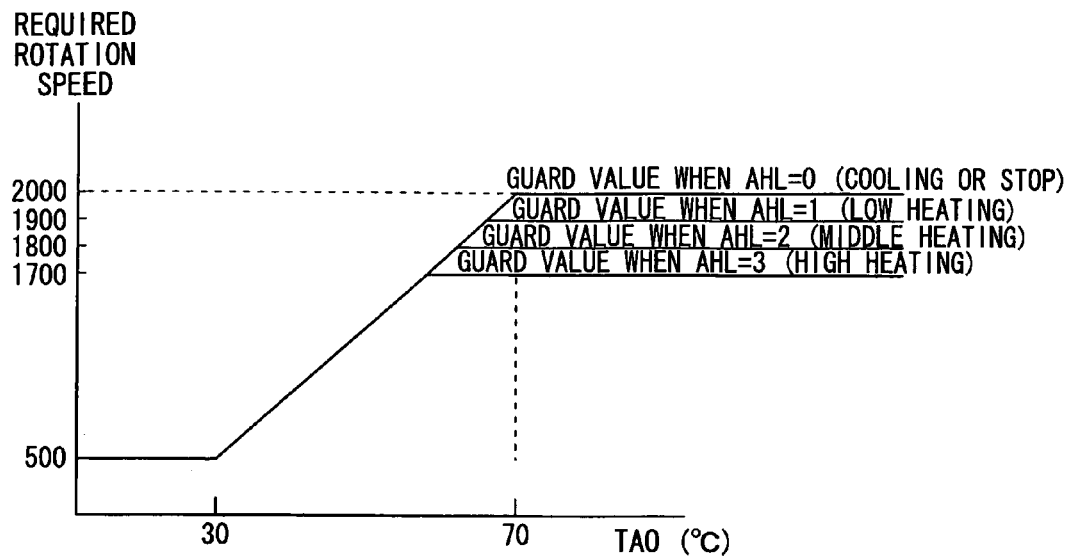
FIG. 24 is a characteristic diagram for determining a requested engine rotation speed in the seventh embodiment of the invention.

That is, in this embodiment, the air conditioning ECU 7 determines a required engine rotation speed according to the target air outlet temperature (TAO) using a characteristic map shown in FIG. 24 (required engine rotation speed—TAO), and then compares the required engine rotation speed with an actual engine rotation speed.

When the required engine rotation speed is lower than the actual engine rotation speed, a requirement signal that requires stopping of the engine 1 and setting the required engine rotation speed to "0" is output to the engine ECU 9.

In contrast, when the required engine rotation speed is higher than the actual engine rotation speed, a requirement signal that requires the actual engine rotation speed to approach the required engine rotation speed is output to the engine ECU 9.

As shown in FIG. 24, the higher the target air outlet temperature (TAO), the higher the required engine rotation speed. Together with this, as the target air outlet temperature (TAO) becomes higher, the exhaust heat from the engine is increased, so that the temperature of coolant is increased, whereby the amount of heat generated from the heater core (main heater) is increased. This can ensure the heating performance.

Additionally, the characteristic of the required engine rotation speed with respect to the target air outlet temperature (TAO) is set to be different for each auxiliary heating level. Specifically, when the auxiliary heating level is 3 (=3) in a case of 30<TAO<T1 (for example, 64), the required engine rotation speed gradually increases from 500 up to 1700 (maximum value), whereas in a case where T1<TAO, the required engine rotation speed keeps the maximum value (guard value) of 1700.

When the auxiliary heating level is 2 (=2) in a case of 30<TAO<T2 (for example, 66), the required engine rotation speed gradually increases from 500 up to 1800 (maximum value), whereas in a case of T2<TAO, the required engine rotation speed keeps the maximum value (guard value) of 1800.

When the auxiliary heating level is 1 (=1) in a case of 30<TAO<T3 (for example, 68), the required engine rotation speed gradually increases from 500 up to 1900 (maximum value), whereas in a case of T3<TAO, the required engine rotation speed keeps the maximum value (guard value) of 1900.

When the auxiliary heating level is 0 (=0) in a case of 30<TAO<70, the required engine rotation speed gradually increases from 500 up to 2000 (maximum value), whereas in a case of 70<TAO, the required engine rotation speed keeps the maximum value (guard value) of 2000.

In this embodiment, the temperature values of T1, T2, T3, and 70 correspond to the second temperature, and are different for the respective auxiliary heating levels. The temperature values T1, T2, T3, and 70 will be hereinafter referred to as a Ty2 on the whole.

When the target air outlet temperature (TAO) is an intermediate temperature (that is, 30<TAO<Ty2), a gradient of the TAO with respect to the required engine rotation speed is the same value regardless of the auxiliary heating level.

In FIG. 24, the temperature value of "30" (=target air outlet temperature (TAO)) corresponds to an example of the first temperature of the invention, in the seventh embodiment.

Ninth Embodiment

Figure 25:
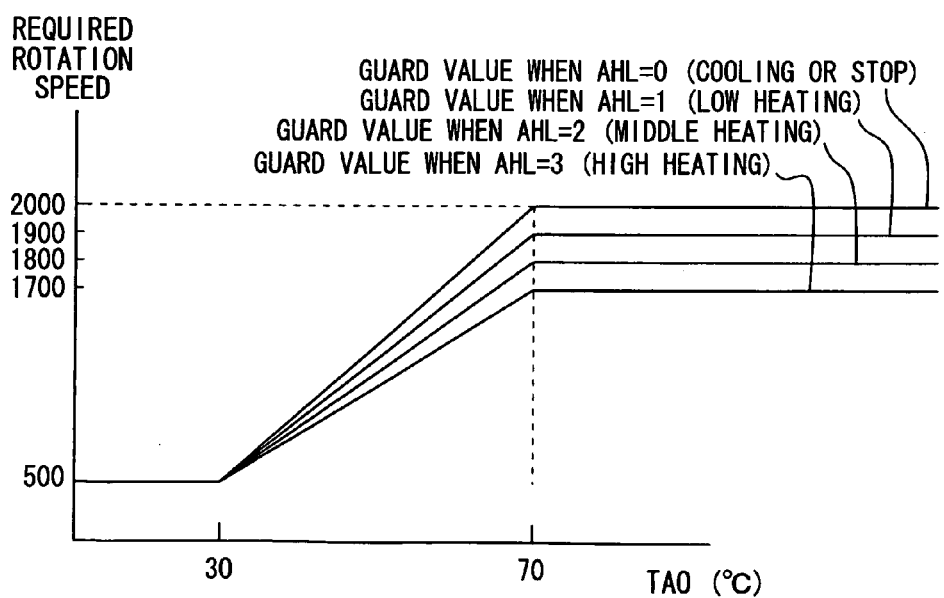
FIG. 25 is a characteristic diagram for determining a requested engine rotation speed in an eighth embodiment of the invention.

In the above-described eighth embodiment, as shown in FIG. 24, when the target air outlet temperature (TAO) is an intermediate temperature (that is, 30<TAO<Ty2), the gradient of the target air outlet temperature (TAO) with respect to the required engine rotation speed has the same value, regardless of the auxiliary heating level. Instead of this, as shown in FIG. 25, the gradient of the target air outlet temperature (TAO) with respect to the required engine rotation speed (required engine rotation speed/target air outlet temperature) may be set to be different for each auxiliary heating level.

Specifically, when 30<TAO<70, the gradient (required engine rotation speed/target air outlet temperature) becomes the maximum value (guard value) that is different for each auxiliary heating level. The respective maximum values (2000, 1900, 1800, 1700) are the same as those of the above-described eighth embodiment.

Thus, the required engine rotation speed can be set in detail for each auxiliary heating level, thereby determining the required engine rotation speed with accuracy.

Other Embodiments

Although the present invention has been fully described in connection with the preferred embodiments thereof with reference to the accompanying drawings, it is to be noted that various changes and modifications will become apparent to those skilled in the art.

For example, in the example of each of the above-described embodiments, the hybrid vehicle is used as the vehicle. That is, the vehicle is adapted to stop the engine 1, if necessary, in running. However, the invention is not limited thereto. The vehicle for use according to the invention may be a vehicle which has only the engine 1 without the electric motor 2 and which is adapted to stop the engine 1 when temporarily stopping after running, such as when waiting at a stoplight.

Such changes and modifications are to be understood as being within the scope of the present invention as defined by the appended claims.

What is claimed is:

1. An air conditioner for a vehicle, comprising:
    a main heater for heating air in a vehicle compartment, using coolant of an engine of the vehicle as a heat source;
    an auxiliary heater for heating air in the vehicle compartment, using a heat source other than exhaust heat of the engine;
    means for outputting a requirement signal for requiring startup of the engine when a temperature of the coolant of the engine is determined to be lower than a threshold; and
    means for adjusting the threshold based on an operating state of the auxiliary heater such that as an amount of heat generated by the auxiliary heater increases, the threshold is decreased, wherein
    when a target temperature (TAO) to be blown into the vehicle compartment is lower than a first temperature, the requirement signal is not output by the outputting means,
    when the target temperature is equal to or higher than the first temperature and lower than a second temperature that is higher than the first temperature, the threshold is increased as the target temperature increases, and
    when the target temperature is equal to or higher than the second temperature, the threshold is a constant value, and the constant value is set to be decreased as the amount of heat generated by the auxiliary heater increases.

2. The air conditioner for a vehicle according to claim 1, further comprising:
    an air conditioning case having an air outlet for blowing out air into the vehicle compartment;
    a blower, disposed in the air conditioning case, for blowing air toward the air outlet;
    a cooler, disposed in the air conditioning case, for cooling air blown from the blower, the main heater being adapted to heat the cooled air flowing from the cooler;
    means for adjusting a temperature of air to be blown out from the air outlet into the vehicle compartment by adjustment of an amount of heat added to the cooled air by the main heater;
    means for detecting a state of an environment in the vehicle compartment;
    means for calculating the target temperature of air to be blown from the air outlet, based on a detection value of the detecting means, the target temperature being required for maintaining the temperature of air in the vehicle compartment at a preset temperature; and
    means for controlling the means for adjusting the temperature such that the temperature of air blown out from the air outlet approaches the target temperature.

3. The air conditioner for a vehicle according to claim 1, wherein
    the second temperature is set so as to be different for each level of heat generated by the auxiliary heater, and
    when the target temperature is equal to or higher than the first temperature and lower than the second temperature, a gradient of the target temperature with respect to the threshold for each level of heat generated by the auxiliary heater is set to have the same value.

4. The air conditioner for a vehicle according to claim 1, wherein
    the second temperature for each level of heat generated by the auxiliary heater is set to the same temperature, and
    when the target temperature is equal to or higher than the first temperature and lower than the second temperature, a gradient of the target temperature with respect to the threshold is set to be different for each level of heat generated by the auxiliary heater.

5. The air conditioner for a vehicle according to claim 1, wherein the auxiliary heater is at least one of a steering heater for heating a steering of the vehicle, a seat heater for heating a seat in the vehicle compartment, an air heater unit for heating air in the vehicle compartment, and a coolant heater unit for heating the coolant of the engine.

6. The air conditioner for a vehicle according to claim 1, wherein the auxiliary heater is an electric heater.

7. The air conditioner according to claim 1 being applicable to a vehicle that is adapted to stop the engine in a vehicle running at a necessary time.

8. The air conditioner for a vehicle according to claim 1, wherein the outputting means does not output the requirement signal for requiring startup of the engine when the temperature of the coolant of the engine is determined to be higher than or equal to the threshold.

* * * * *